United States Patent [19]

Komine et al.

[11] Patent Number: 5,548,973
[45] Date of Patent: Aug. 27, 1996

[54] SEALED TYPE COMPRESSOR AND REFRIGERATING CYCLE

[75] Inventors: Kenji Komine, Shizuoka-ken; Hiroyuki Isegawa, Shizuoko-ken, both of Japan

[73] Assignee: Kabushiki Kaisha Toshiba, Kawasaki, Japan

[21] Appl. No.: 429,878

[22] Filed: Apr. 27, 1995

[30] Foreign Application Priority Data

Apr. 28, 1994 [JP] Japan ..................... 6-092415

[51] Int. Cl.⁶ .............. F04C 29/00; F04B 39/00
[52] U.S. Cl. ................... 62/469; 252/68
[58] Field of Search ............... 62/468, 469, 84, 62/114; 252/67, 68; 418/902

[56] References Cited

U.S. PATENT DOCUMENTS

| 5,395,544 | 3/1995 | Hagihara et al. ............ 252/68 |
| 5,447,647 | 9/1995 | Ishida et al. ................ 252/68 |

FOREIGN PATENT DOCUMENTS

| 3202681 | 9/1991 | Japan . |
| 3281991 | 12/1991 | Japan . |
| 422789 | 1/1992 | Japan . |
| 4183788 | 6/1992 | Japan . |
| 4292586 | 10/1992 | Japan . |
| 4314988 | 11/1992 | Japan . |
| 560079 | 3/1993 | Japan . |
| 5106581 | 4/1993 | Japan . |

*Primary Examiner*—Henry A. Bennett
*Assistant Examiner*—William C. Doerrler
*Attorney, Agent, or Firm*—Cushman Darby & Cushman, L.L.P.

[57] ABSTRACT

A sealed-type compressor used with HFC refrigerant. The sealed-type compressor houses a motor and compression machinery in a sealed case. The compression machinery includes at least a pair of sliding members wherein one sliding member having aluminum as its main body and having its surface alumite treated and the other sliding member having a metal material. The compressor includes an at least quadrivalent ester oil for the refrigerating machine oil which lubricates the sliding members.

48 Claims, 20 Drawing Sheets

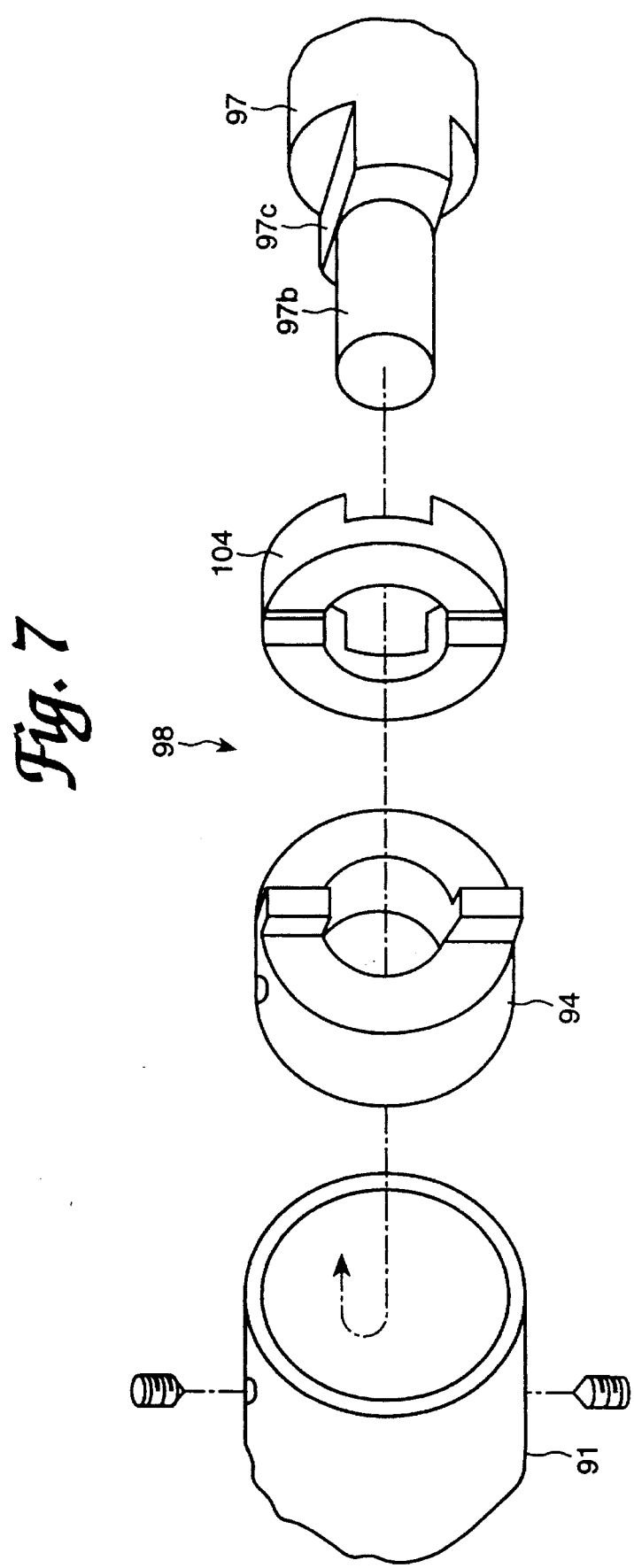

Fig. 8

| Example/Comparative Example | Sliding Members | | Sliding Member (Partner Material) | Refrigerating Machine Oil | Wear | | Sludge (Contamination) | | Refrigerant | Remarks (Proportion of Refrigerant) |
|---|---|---|---|---|---|---|---|---|---|---|
| | Parent Material | Surface Treatment | | | ① | ④ | ① | ④ | | |
| Example 1 | Aluminum (Vane, Connecting Rod) | Alumite Treatment | Carbon Steel [S45C] | 3 | △ | △ | △ | △ | 134a | |
| | | | | 3 | × | × | × | × | 32/125/134a | (25/25/50wt%) |
| | | | Aluminum | 4 | ○ | ○ | ○ | ○ | 134a | |
| | | | | 4 | ○ | ○ | ○ | ○ | 32/125/134a | (25/25/50wt%) |
| Comparative Example 1 | Aluminum (Vane, Connecting Rod) | Untreatment | Aluminum | 3 | × | × | × | × | 134a | |
| | | | | 4 | × | × | × | × | 32/125/134a | (25/25/50wt%) |
| Comparative Example 2 | Aluminum (Vane, Connecting Rod) | Untreatment | Carbon Steel [S45C] | 3 | × | × | × | × | 134a | |
| | | | | 3 | × | × | × | × | 32/125/134a | (25/25/50wt%) |
| | | | Aluminum | 4 | △ | △ | × | × | 134a | |
| | | | | 4 | × | × | × | × | 32/125/134a | (25/25/50wt%) |
| Comparative Example 3 | Aluminum (Vane, Connecting Rod) | Alumite Treatment | Aluminum | 3 | △ | △ | × | × | 134a | |
| | | | | 3 | × | × | × | × | 32/125/134a | (25/25/50wt%) |
| | | | | 4 | △ | △ | △ | △ | 134a | |
| | | | | 4 | × | × | × | × | 32/125/134a | (25/25/50wt%) |

① Reciprocating Compressor (connecting rod, crankshaft)  ④ Scroll Compressor (Vane, Oldham's Ring)

Fig. 9

| Example | Sliding Members | | Sliding Member (Partner Material) | Refrigerating Machine Oil | Wear | | | Sludge (Contamination) | | | Refrigerant | Remarks (Proportion of Refrigerant) |
|---|---|---|---|---|---|---|---|---|---|---|---|---|
| | Parent Material | Surface Treatment | | | ① | ④ | | ① | ④ | | | |
| Example 2 | Aluminum | Aluminte Treatment MoS$_2$ | Aluminum | 3 | △ | △ | | △ | △ | | 134a | |
| | | | | 3 | × | × | | × | × | | 32/125/134a | (25/25/50wt%) |
| | | | | 4 | ○ | ○ | | ○ | ○ | | 134a | |
| | | | | 4 | ○ | ○ | | ○ | ○ | | 32/125/134a | (25/25/50wt%) |
| Example 3 | Aluminum | Aluminte Treatment and MoS$_2$ | Carbon Steel [S45C] | 3 | △ | △ | | △ | △ | | 134a | |
| | | | | 3 | △ | △ | | × | × | | 32/125/134a | (25/25/50wt%) |
| | | | | 4 | ◎ | ◎ | | ○ | ○ | | 134a | |
| | | | | 4 | ○ | ○ | | ○ | ○ | | 32/125/134a | (25/25/50wt%) |
| Example 4 | Aluminum | Aluminte Treatment and MoS$_2$ | Oxide Treatment on Carbon Steel | 3 | △ | △ | | △ | △ | | 134a | |
| | | | | 3 | △ | △ | | × | × | | 32/125/134a | (25/25/50wt%) |
| | | | | 4 | ◎ | ◎ | | ○ | ○ | | 134a | |
| | | | | 4 | ◎ | ◎ | | ○ | ○ | | 32/125/134a | (25/25/50wt%) |
| Example 5 | Aluminum | Alumite Treatment and PTFE | Cast Iron [Fc2000] | 3 | △ | △ | | △ | △ | | 134a | |
| | | | | 3 | △ | △ | | × | × | | 32/125/134a | (25/25/50wt%) |
| | | | | 4 | ◎ | ◎ | | ○ | ○ | | 134a | |
| | | | | 4 | ○ | ○ | | ○ | ○ | | 32/125/134a | (25/25/50wt%) |

① Reciprocating Compressor (connecting rod, crankshaft)   ④ Scroll Compressor (Vane, Oldham's Ring)

|  | Metal Composition (wt %) | Density Ratio (%) | Hardness (HRB) | Amount of Wear (μm) | | Remarks |
| --- | --- | --- | --- | --- | --- | --- |
|  |  |  |  | Pin | Disk |  |
| Modification 1 | Cu 1% C 0.8% Remainder FE (Surface Oxidation = Steam Treatment) | 88 | 80 | 10.5 | 0.9 | SMF 4 |
| Modification 2 | Cu 2% C 0.8% Remainder Fe + (Cu-Sn Infiltration) | 99 | 90 | 4.6 | 1.4 | SMF 4 |
| Modification 3 | Cu 2% C 0.8% Remainder Fe + (Cu Infiltration) | 99 | 90 | 2.3 | 1.0 | SMF 4 |

Fig. 14

| Example/ Comparative Example | Sliding Members | | Sliding Member (Partner Material) | Refrigerating Machine Oil | Wear | | Sludge (Contamination) | | Refrigerant | Remarks [Amount of Wear (μm)] |
|---|---|---|---|---|---|---|---|---|---|---|
| | Parent Material | Surface Treatment | | | ② | ③ | ② | ③ | | |
| Example 8 | Blade SKH Material (SKH51) with a Hardness of at Least HV1000 | Nitride Treatment | Cast Iron Containing Mo-Ni-Cr | 3 | △ | △ | △ | △ | 134a | 17 |
| | | | | 3 | × | × | × | × | 32/134a | 27 |
| | | | | 4 | ◎ | ◎ | ○ | ○ | 134a | 4.5 |
| | | | | 4 | ◎ | ◎ | ○ | ○ | 32/134a | 5 |
| Example 9 | Blade SUS Material (SUS440C) with a Hardness of at Least HV1000 | Nitride Treatment | Cast Iron Containing Mo-Ni-Cr | 3 | △ | △ | △ | △ | 134a | 15-16 |
| | | | | 3 | × | × | × | × | 32/134a | 25 |
| | | | | 4 | ◎ | ◎ | ○ | ○ | 134a | 4 |
| | | | | 4 | ◎ | ◎ | ○ | ○ | 32/134a | 4.5 |
| Comparative Example 4 | Blade SKH51 (Containing C) with a Hardness of Less Than HV1000 | Untreated | Cast Iron Containing Mo-Ni-Cr | 3 | × | × | × | × | 134a | 39 |
| | | | | 4 | △ | △ | △ | △ | 134a | 15 |
| | | | | Mineral Oil | ○ | ○ | ○ | ○ | HCFC22 | 9 |
| Comparative Example 5 | Blade SUJ2 with a Hardness of Less Than HV1000 | Untreated | Cast Iron Containing Mo-Ni-Cr | 3 | × | × | × | × | 134a | 40 |
| | | | | 4 | △ | △ | △ | △ | 134a | 16 |
| | | | | Mineral Oil | ○ | ○ | ○ | ○ | HCFC22 | 10 |

① Low Temperature Rotary Compressor (blade, roller)    ③ High Temperature (blade, roller)

Fig. 15

| Example | Sliding Materials | | Sliding Member (Partner Material) | Refrigerating Machine Oil | Wear | | Sludge (Contamination) | | Refrigerant |
|---|---|---|---|---|---|---|---|---|---|
| | Parent Material | Surface Treatment | | | ② | ③ | ② | ③ | |
| Example 10 | Group IV Nitride (TiN) | Untreated | Cast Iron Containing Mo-Ni-Cr | 3 | △ | △ | △ | △ | 134a |
| | | | | 3 | × | × | × | × | 32/134a |
| | | | | 4 | ○ | ○ | ○ | ○ | 134a |
| | | | | 4 | ○ | ○ | ○ | ○ | 32/134a |
| Example 11 | Group IV Carbide (TiC) | Untreated | Cast Iron Containing Mo-Ni-Cr | 3 | △ | △ | △ | △ | 134a |
| | | | | 3 | × | × | × | × | 32/134a |
| | | | | 4 | ○ | ○ | ○ | ○ | 134a |
| | | | | 4 | ○ | ○ | ○ | ○ | 32/134a |
| Example 12 | Group IV Oxide (TiO) | Untreated | Cast Iron Containing Mo-Ni-Cr | 3 | △ | △ | △ | △ | 134a |
| | | | | 3 | × | × | × | × | 32/134a |
| | | | | 4 | ○ | ○ | ○ | ○ | 134a |
| | | | | 4 | ○ | ○ | ○ | ○ | 32/134a |
| Example 13 | Group IV Mixture (TiC, TiN) | Untreated | Cast Iron Containing Mo-Ni-Cr | 3 | △ | △ | △ | △ | 134a |
| | | | | 3 | × | × | × | × | 32/134a |
| | | | | 4 | ○ | ○ | ○ | ○ | 134a |
| | | | | 4 | ○ | ○ | ○ | ○ | 32/134a |

② Low Temperature Rotary Compressor (blade, roller)  ③ High Temperature Rotary Compressor (blade, roller)

Fig. 16

| Example | Sliding Material | | Partner Material | Refrigerating Machine Oil | Wear ② | Wear ③ | Sludge (Contamination) ② | Sludge (Contamination) ③ | Refrigerant (Amount of Wear) |
|---|---|---|---|---|---|---|---|---|---|
| | Parent Material | Surface Treatment | | | | | | | |
| Example 14 | Group IV Oxide Zirconia and Group III Oxide Alumina | Untreated | Cast Iron Containing Mo-Ni-Cr | 3 | ◎ | ◎ | ○ | ○ | 134a |
| | | | | 3 | ◎ | ◎ | ○ | ○ | 32/134a |
| | | | | 4 | ★ | ★ | ◎ | ◎ | 134a (Less Than 1 μm) |
| | | | | 4 | ★ | ★ | ◎ | ◎ | 32/134a (Less Than 1 μm) |

② Low Temperature Rotary Compressor (blade, roller)

③ High Temperature Rotary Compressor (blade, roller)

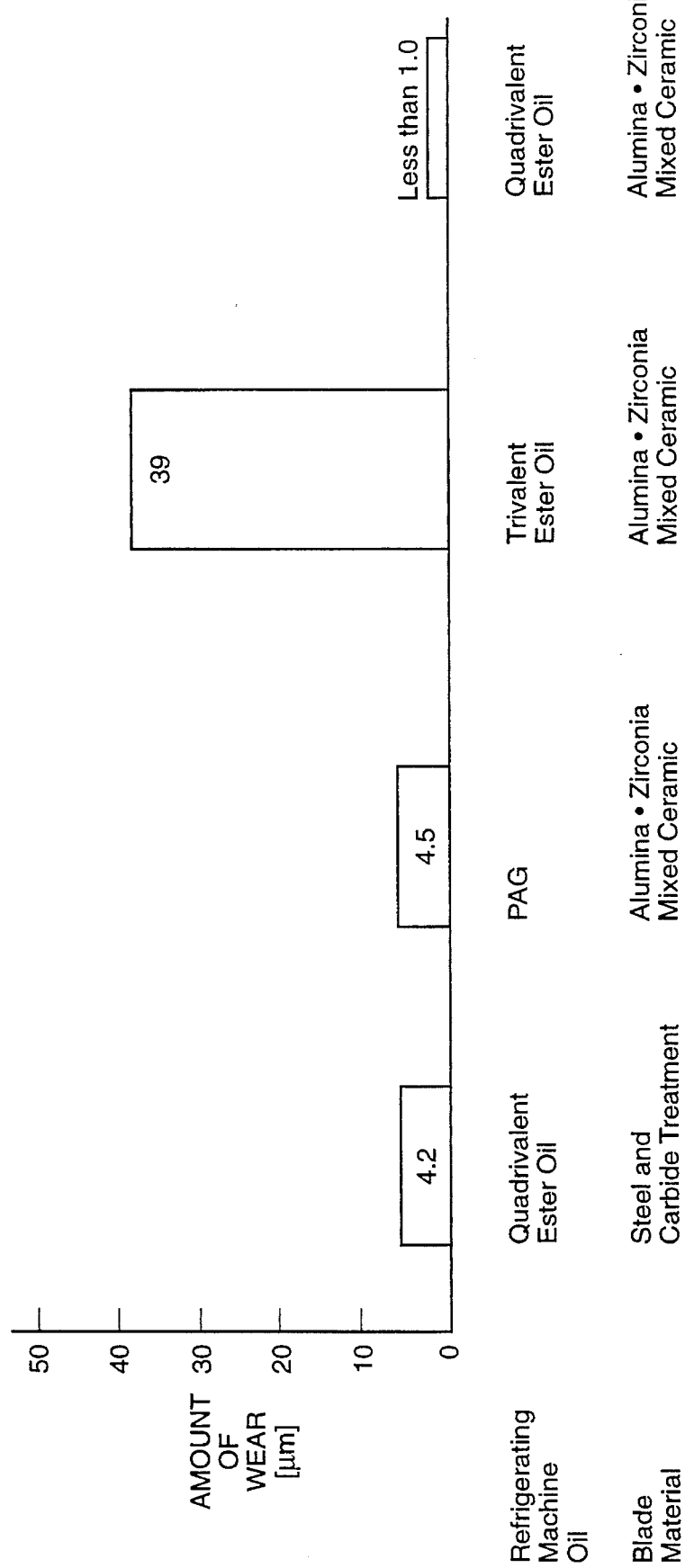

Fig. 18

| Example | Sliding Material | | Sliding Member (Partner Material) | Refrigerating Machine Oil | Wear | Refrigerant | Remarks (Proportion of Refrigerant) |
|---|---|---|---|---|---|---|---|
| | Parent Material | Surface Treatment | | | | | |
| Example 15 | Group IV Carbide TiC | Thin Film of Same Type TiN | Cast Iron Containing Mo-Ni-Cr | 3 | △ | 134a | |
| | | | | 3 | × | 32/134a | (30/70wt%) |
| | | | | 4 | ◎ | 134a | |
| | | | | 4 | ○ | 32/134a | (30/70wt%) |
| Example 16 | Group V Carbide VC | Thin Film of Same Type VN | Cast Iron Containing Mo-Ni-Cr | 3 | △ | 134a | |
| | | | | 3 | × | 32/134a | (30/70wt%) |
| | | | | 4 | ◎ | 134a | |
| | | | | 4 | ○ | 32/134a | (30/70wt%) |
| Example 17 | Group VI Carbide CrC | Thin Film of Same Type CrN | Cast Iron Containing Mo-Ni-Cr | 3 | △ | 134a | |
| | | | | 3 | × | 32/134a | (30/70wt%) |
| | | | | 4 | ◎ | 134a | |
| | | | | 4 | ○ | 32/134a | (30/70wt%) |

Fig. 19

| Example | Sliding Material | | Refrigerating Machine Oil | Wear | Refrigerant | Remarks (Proportion of Refrigerant) |
|---|---|---|---|---|---|---|
| | Parent Material | Surface Treatment | | | | |
| Example 18 | Group IV Nitride TiN | Thin Film of Same Type TiC | 3 | △ | 134a | |
| | | | 3 | × | 32/125 | (60/40wt%) |
| | | | 4 | ○ | 134a | |
| | | | 4 | ○ | 32/125 | (60/40wt%) |
| Example 19 | Group V Nitride VN | Thin Film of Same Type VC | 3 | △ | 134a | |
| | | | 3 | × | 32/125 | (60/40wt%) |
| | | | 4 | ○ | 134a | |
| | | | 4 | ○ | 32/125 | (60/40wt%) |
| Example 20 | Group VI Nitride CrN | Thin Film of Same Type CrC | 3 | △ | 134a | |
| | | | 3 | × | 32/125 | (60/40wt%) |
| | | | 4 | ○ | 134a | |
| | | | 4 | ○ | 32/125 | (60/40wt%) |

Sliding Member (Partner Material): Cast Iron Containing Mo-Ni-Cr (for all examples)

Fig. 20

| Example/Comparative Example | Sliding Material | | Sliding Member (Partner Material) | Refrigerating Machine Oil | Wear | Refrigerant |
|---|---|---|---|---|---|---|
| | Parent Material | Surface Treatment | | | | |
| Example 21 | Group IV Oxide TiO | Thin Film of Same Type TiN | Cast Iron Containing Mo-Ni-Cr | 3 | △ | 134a |
| | | | | 3 | × | 32/125/134a |
| | | | | 4 | ○ | 134a |
| | | | | 4 | ○ | 32/125/134a |
| Example 22 | Group V Oxide VO | Thin Film of Same Type VN | Cast Iron Containing Mo-Ni-Cr | 3 | △ | 134a |
| | | | | 3 | × | 32/125/134a |
| | | | | 4 | ○ | 134a |
| | | | | 4 | ○ | 32/125/134a |
| Example 23 | Group VI Oxide CrO | Thin Film of Same Type CrN | Cast Iron Containing Mo-Ni-Cr | 3 | △ | 134a |
| | | | | 3 | × | 32/125/134a |
| | | | | 4 | ○ | 134a |
| | | | | 4 | ○ | 32/125/134a |
| Comparative Example 6 | Group VI Nitride CrN | Group IV Nitride TiN | Cast Iron Containing Mo-Ni-Cr | 3 | × | 134a |
| | | | | 3 | × | 32/125/134a |
| | | | | 4 | × | 134a |
| | | | | 4 | × | 32/125/134a |
| | | | | Mineral Oil | ○ | 22 |

Fig. 21

| Molecular Structure of Branched Type Ester Oil | |
|---|---|
| Basic Structure | Structure within Branch |
| $$\begin{array}{c} R \\ | \\ R-C-R \\ | \\ R \end{array}$$ | Ester Radical, α Carbon<br><br>$Ri-CH[CO] \cdot CH \cdot CH_2 \cdot CH_2 \cdot CH_3$<br>$\hspace{3.5cm}|$<br>$\hspace{3.2cm}(C_2H_5)$<br><br>Steric Hindrance |
| Raw Material Substance | |
| Quadrivalent Alcohol | Carboxylic Acid (univalent) |
| $$HOCH_2 - \underset{\underset{CH_2OH}{|}}{\overset{\overset{CH_2OH}{|}}{C}} - CH_2OH$$<br><br>(Pentaerythritol; tetramethylolmethane) | $C_4H_9 \underset{\underset{C_2H_5}{|}}{CH}COOH$<br><br>(2-ethylexanoic acid) |

5,548,973

SEALED TYPE COMPRESSOR AND REFRIGERATING CYCLE

BACKGROUND OF THE INVENTION

1. Field of Invention

The present invention relates to a sealed type compressor having sliding members to compress HFC refrigerants and refrigerating cycle using the sealed type compressor.

2. Description of Related Art

Refrigerating cycles are broadly used in refrigerating equipment, such as refrigerators and refrigerated showcases, and in air conditioners which cool and/or heat the insides of rooms. Sealed type compressors which compress and circulate the refrigerant are used in these refrigerating cycles.

The sealed type compressor has a sealed case, a motor and compression machinery which is driven by this motor. Both the motor and the compression machinery are inside of the sealed case. In a refrigeration cycle, a refrigerant is compressed by the compressor, and discharged at high temperature and high pressure to circulate through the refrigeration cycle.

It is known to use, in refrigerating cycles including those which include sealed type compressors, chlorofluorocarbon refrigerant CFC12 (hereafter, "R12 refrigerant") or hydrochlorofluorocarbon refrigerant HCFC22 (hereafter, "R22 refrigerant") as a refrigerant. The compressors include sliding members to compress the refrigerant. Such compressors require that oil be supplied to lubricate these sliding members. Naphthene group and paraffin group mineral oils with superior compatibility with R12 and R22 refrigerants have been used as the oil for lubricating such compressors.

When using R12 as the refrigerant, chlorine (Cl) atoms in the R12 react with iron (Fe) atoms of metal base material to form an iron chloride film on the surface of iron based materials. The iron chloride film has self-lubricating properties and high wear resistance. The iron chloride film prevents iron based material from contacting another sliding member which causes wear.

An additional benefit of using R12 is that R12 and the conventional refrigerating machine oil are non-polar. Thus, both have a low absorbency. Therefore, the iron chloride film formed on the iron base material exists as a stable lubricating film without hydrolysis taking place.

However, R12 refrigerant is chemically extremely stable in the atmosphere. Therefore, even small amounts of R12 refrigerant exhausted into the atmosphere reach the ozone layer, and damage it. Accordingly, R12 has been designated to be a specific Freon that damages the ozone layer and has been subjected to severe limitations in its use. On the other hand, R22 refrigerant easily decomposes in the atmosphere and therefore has been designated as a specific Freon that causes less (although it still causes some) damage the ozone layer. Therefore, it has been decided, as a matter of international policy, to curtail the use of R22 refrigerant as well.

In view of the ozone damage problem, recently, HFC (hydrofluorocarbon) refrigerants which do not cause ozone damage, have been developed as substitute Freons to replace the specific Freons designated to be harmful. However, HFCs do not have chlorine atoms (sometimes they are referred to as non-chlorine refrigerants). Thus, there is no natural self lubricating that occurs by the combination of iron and chlorine.

Furthermore, when a sealed-type compressor operates with HFC refrigerant and uses a naphthene group or paraffin group mineral oil as its machine oil, the naphthene group or paraffin group mineral oil does not dissolve in HFC refrigerant. There is poor compatibility between these oils and HFC refrigerants. Return of oil discharged from the sealed-type compressor into the refrigerating cycle is poor and lubrication and cooling of sliding members of the compressor suffers. In the worst case, the poor lubrication causes a fusing of sliding members of the compressor. For this reason, it is necessary to develop a refrigerating machine oil having better compatibility with HFC refrigerants. In fact, the development of various refrigerating machine oils is progressing. Among these, PAG (polyalkyleneglycol) oil, which has been widely adopted for car air conditioners, has good compatibility with HFC refrigerant.

However, PAG oil has low volume resistivity, and low electric insulation resistance. Therefore, it cannot be used in sealed-type compressors in which an electric motor is immersed in machine oil.

Other oils recently attracting attention for possible use in sealed-type compressors are ester oils which are synthesized from fatty acids and alcohols. Ester oils have excellent compatibility with HFC refrigerants, and they are superior to mineral oil in their resistance to heat. They also have thermal stability (heat resistance) and a good electric insulation resistance. However, their resistance to hydrolysis and their wear resistance vary greatly depending on the base oil chemical structure. Furthermore, its lubrication ability is poorer than that of a conventional combination of CFC refrigerant and HCFC refrigerants with mineral oil.

For example, when ester oil is used to lubricate a sealed-type compressor operating with HFC refrigerant, the wear resistance properties of cast iron, carbon steel, alloy steel, sintered alloy or stainless steel, etc. used for the sliding members of the compressor is lower. Thus, the compressor cannot be operated stably over a long period of time.

SUMMARY OF THE INVENTION

It is an object of the invention to provide an improved sealed-type compressor for HFC refrigerant that has a high wear-resistance sliding member.

It is another object of the invention to provide an improved refrigerating cycle using a sealed-type compressor for HFC refrigerant that has a high wear-resistance sliding member.

It is a further object of the invention to provide a sealed-type compressor which can stably operate over a long period of time when compressing an HFC refrigerant.

It is a further object of the invention to provide the ester oil as a refrigerating machine oil for a sealed-type compressor that has excellent compatibility with HFC refrigerant, good heat resistance and electric insulation resistance properties, and can effectively prevent the formation of sludge.

To achieve the above objects, the present invention provides an improved sealed-type compressor housing a motor and a compression machinery in a sealed case which uses HFC refrigerant. The compression machinery includes at least a pair of sliding members one of which is made of aluminum and which has a surface alumite treatment and the other of which is made of a metal material. The compressor uses an ester oil that is at least quadrivalent as the refrigerating machine oil which lubricates the sliding members of the compressor.

BRIEF DESCRIPTION OF THE DRAWINGS

In the accompanying drawings;

FIG. 7 is an exploded assembly drawing which shows an Oldham's mechanism provided in the helical compressor shown in FIG. 6;

FIG. 8 is a table which shows compressor sliding members wear assessments and contamination assessments obtained by Test 1 on an embodiment of a sealed-type compressor according to the invention, together with comparative examples;

FIG. 9 is a table which shows compressor sliding members wear assessments and contamination assessments in sealed-type compressors obtained by Examples 2 to 5;

FIG. 14 is a table showing compressor sliding members wear assessments and contamination assessments obtained by tests on embodiments of a sealed-type compressor according to the invention, together with comparative examples;

FIG. 15 is a table of the compressor sliding parts wear assessments and contamination assessments of sealed-type compressors obtained by Examples 10 to 13;

FIG. 16 is a table of the compressor sliding parts wear assessments and contamination assessments of sealed-type compressors obtained by Example 14;

FIG. 17 is a graph showing a comparison of vane material wear amounts for various refrigerating machine oils;

FIG. 18 is a table showing the results of Examples 15 to 17 obtained by fiction wear tester tests of sealed-type compressors;

FIG. 19 is a table showing the results of Tests 18 to 20 obtained in the same way as for FIG. 18.

FIG. 20 is a table showing the results of Tests 21 to 23 obtained in the same way as for FIG. 18.

FIG. 21 is a diagram showing the results of analysis of the molecular structure of a branched type ester oil using nuclear magnetic resonance imaging equipment.

DETAILED DESCRIPTION OF PREFERRED EMBODIMENTS

Embodiments of the present invention will be explained with reference to the accompanying drawings.

Sealed-type compressors are used in refrigerating cycles of refrigerating systems, such as refrigerators and refrigerated show-cases, and in air conditioners which cool/heat rooms. They are broadly classified into reciprocating, rotary, scroll, and helical types. Sealed-type rotary compressors are further classified into low temperature rotary compressors which are used in refrigerators and the like, and high temperature rotary compressors which are used in air conditioners.

Figure 1:
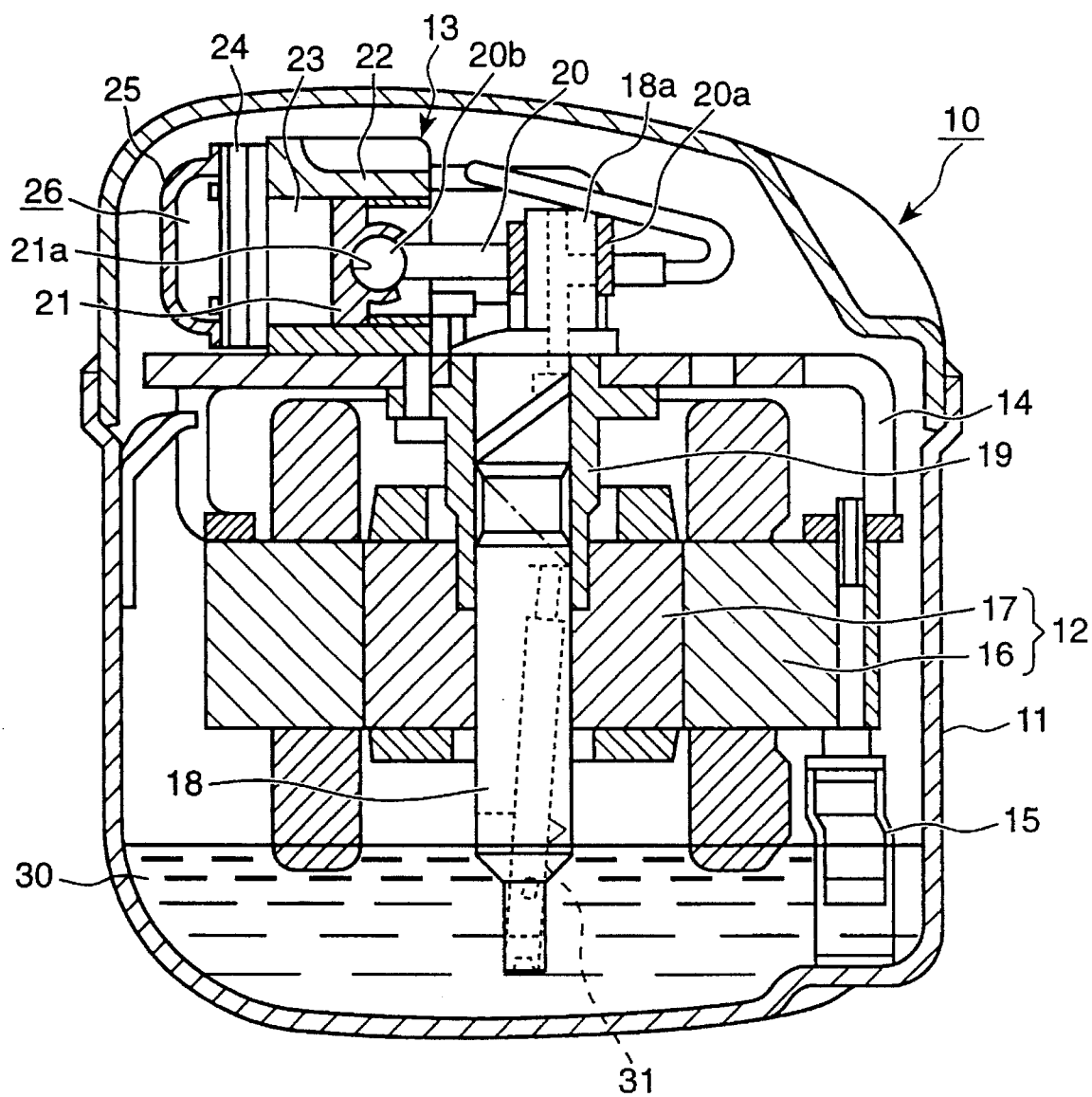
FIG. 1 is a vertical cross-sectional view of a sealed-type reciprocating compressor according to the present invention.

This invention is applicable to all types of sealed compressors. First, sealed-type reciprocating compressors will be explained. A typical sealed-type reciprocating compressor 10 is shown in FIG. 1. A motor 12 is installed in the lower part of a sealed case 11, and compression machinery 13 driven by motor 12 is installed in the upper part of the sealed case. Motor 12 and compression machinery 13 are assembled in on a fixed frame 14. The assembly of motor 12, compression machinery 13 and fixed frame 14 is supported by multiple supporting springs 15 so that the entire assembly floats in sealed case 11. Motor 12 has stator 16 and rotor 17. A crankshaft 18, which is a rotating shaft, is firmly fixed with rotor 17 and is rotatably supported by a bearing 19 fixed to fixed frame 14.

A crank 18a of crankshaft 18 projects above bearing 19. A big end 20a of a connecting rod 20 which forms a piston rod connects with crank 18a. A small end ball 20b of connecting rod 20 is linked to a piston 21. Piston 21 is slidably supported inside a cylinder chamber 23 of a cylinder 22. A ball joint between small end ball 20b and piston 21 is formed by small end ball 20b of connecting rod 20 and a ball socket 21a of piston 21.

One side of cylinder 22 is covered by cylinder cover 25 via a head plate 24 which is provided with a discharge valve (not shown) and a suction valve (not shown). A suction chamber and discharge chamber 26 are formed inside cylinder cover 25. Discharge chamber 26 discharges compressed refrigerant to the outside of sealed case 11 via a discharge pipe and a discharge muffler (not shown).

Next to discharge chamber 26, a suction chamber (not shown) is provided. Refrigerant enters sealed case 11 passing through a suction pipe (not shown), then enters the suction space through the suction chamber. The refrigerant enters cylinder chamber 23 from the suction space via the suction valve. Inside cylinder chamber 23, adiabatic compression occurs as a result of the reciprocating motion of piston 21. The sealed-type reciprocating compressor 10 shown in FIG. 1 is a vertically arranged type compressor which makes a low pressure inside sealed case 11. However, sealed-type reciprocating compressors which make a high pressure inside sealed case 11 and which are horizontally arranged have almost all of the same configurations.

Refrigerating machine oil 30 which lubricates and cools the compressor sliding members is stored in the bottom of sealed case 11. Refrigerating machine oil 30 is forced to the compressor sliding members by an oil pump 31, which is formed inside crankshaft 18, to lubricate the compressor sliding members. The compressor sliding members are formed in a supporting construction which slidably support a sliding material. The sliding members are composed of one sliding member and another sliding member which is a partner to one sliding member. In practice, in the compressor sliding parts, there are crankshaft 18 and bearing 19, crank 18a of crankshaft 18 and big end 20a of connecting rod 20; small end ball 20b of connecting rod 20 and ball socket 21a of piston 21; piston 21 and cylinder 22.

These sliding members contain a ferrous alloy which includes at least one of the following materials: silicon, manganese, nickel, chromium, copper, aluminum, tungsten, molybdenum, vanadium, cobalt and zirconium. Examples of ferrous alloys are: alloy steel, carbon steel, stainless steel and sintered alloy. Another material for sliding member, aluminum, may be used for at least one of the sliding members to make the compressor sliding parts lighter.

On the other hand, an HFC refrigerant which has an ozone damage coefficient of zero and is friendly to the environment is used as the refrigerant of this sealed-type reciprocating compressor 10. Among HFC refrigerants, 1,1,1,2 -tetrafluoroethane (hereafter, called "R134a refrigerant") is typical of a single refrigerant. However, difluoromethane (R32) which has a higher discharge pressure (and temperature) than the HCFC R22 refrigerant, pentafluoroethane (R125), 1,1,2,2-tetrafluoroethane (R134), 1,1,2-trifluoroethane (R143), 1,1,1 trifluoroethane (R143a) 1,1-difluoroethane (R152a) and lnonofluoroethane (R161) may be used.

An ordinary reciprocating compressor is used for a refrigerator which uses R12 of CHC refrigerant and for an air conditioner which uses R22 of HCHC refrigerant. Among the above described HFC single refrigerants, R134, R134a, R143 and R143a have boiling points close to that of R12 of CFC refrigerant and have similar thermal properties. Therefore, R134, R134a, R143 and R143a are preferable as refrigerants for sealed-type reciprocated compressor used in refrigerator. Furthermore, HFC refrigerants are not only used as single refrigerants. Mixed refrigerants which are mixture of two or more types of HFC single refrigerants may be used. Examples of HFC mixed refrigerants include: R125/R143/R134a, R32/R134a, R32/R125, R32/R125/R134a, and R125/R134a.

Refrigerating machine oil 30 which lubricates and cools the compressor sliding members of sealed-type reciprocating compressor 10 comprises a quadrivalent ester oil which has excellent compatibility with HFC refrigerant. Quadrivalent ester oil is a synthetic oil which is synthesized from a quadrivalent alcohol (pentaerythritol) and a fatty acid. A quadrivalent ester oil has better wear resistance for sliding members than that of a trivalent ester oil.

Compared with a trivalent ester oil, a quadrivalent ester oil has more carboxyl groups as functional groups. Therefore, its bonding force with the sliding members of the sealed compressor is greater. Thus, the wear resistance of the sliding members is improved. When an at least quinquevalent ester oil is used as the refrigerating machine oil 30, the bonding force with the sliding members further improves, and this is preferable. However, the quinquevalent ester oil is more expensive than the quadrivalent ester oil.

The operation of the sealed-type reciprocating compressor will now be explained. When motor 12 is turned on, motor 12 activates and rotor 17 is rotated. Crankshaft 18 which is integrated with rotor 17 also rotates. The rotational torque of motor 12 is transmitted from crankshaft 18 to piston 21 via crank 18a and connecting rod 20. Thus, piston 21 is reciprocated inside cylinder 22. The HFC refrigerant is drawn into cylinder chamber 23 from the suction chamber and is compressed by the reciprocating motion of piston 21. The refrigerant, having been made high temperature and high pressure by compression, is discharged to discharge chamber 26. After it has been muffled by a discharge muffler, the pulsation of the discharge pressure is smoothed and discharged into the refrigerating cycle from the discharge pipe. On the other hand, refrigerant from the refrigerating cycle is drawn into the inside of sealed case 11, and led to cylinder chamber 23 via a suction space from a suction chamber formed inside sealed case 11, and is prepared for the next refrigerant compression operation.

Figure 2:
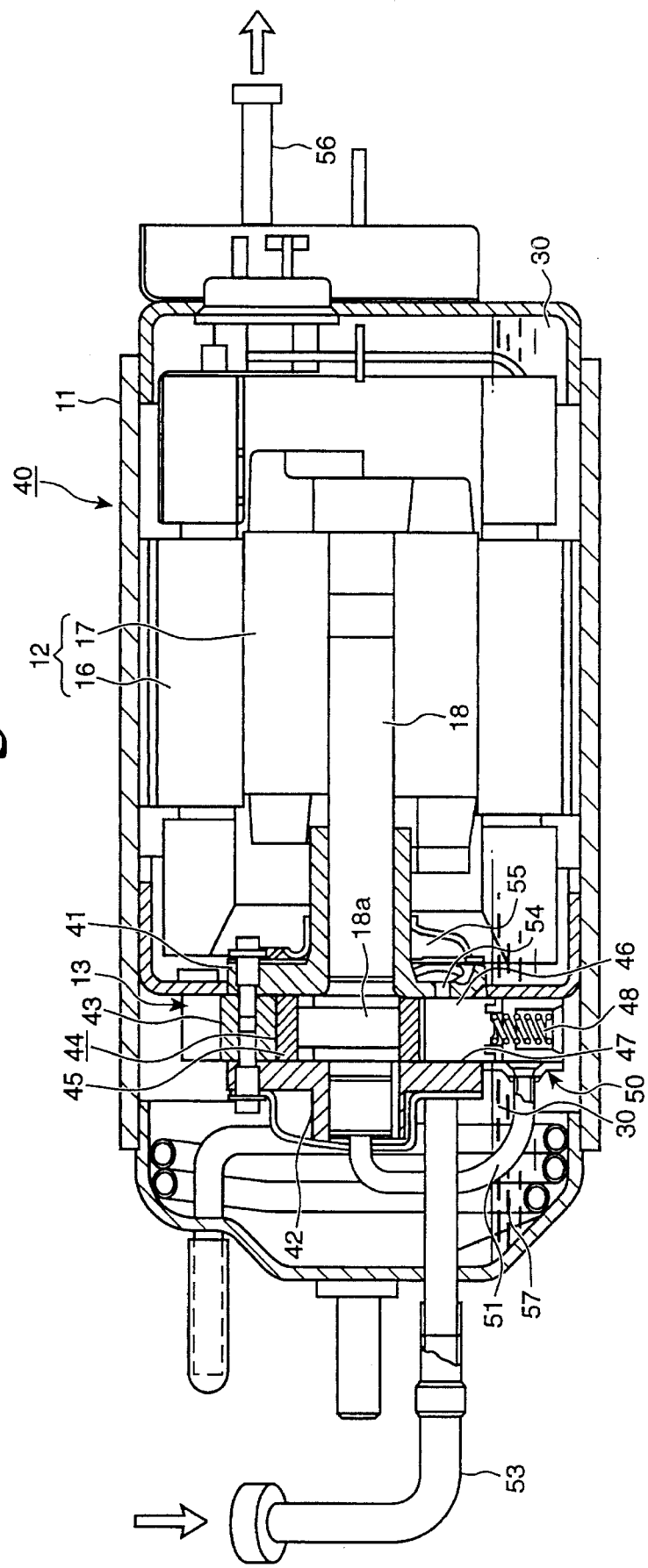
FIG. 2 is a vertical cross-sectional view of a sealed-type low temperature rotary compressor according to the present invention.

A horizontally arranged sealed-type compressor which is a low temperature rotary compressor for a refrigerator is shown in FIG. 2. Elements having the same functions as in the FIG. 1 embodiment are indicated by the same reference numeral and may not be fully described. A low temperature rotary compressor is a compressor in which the evaporation temperature of the refrigerant is less than 5° C.

In this sealed-type low temperature rotary compressor 40, motor 12 and compression machinery 13 driven by motor 12 are assembled and installed inside sealed case 11. Motor 12 has stator 16 which is press-fitted in sealed case 11 and rotor 17 which is housed inside stator 16. Crankshaft 18 passes through rotor 17 and is fixed with rotor 17. Thus, crankshaft 18 and rotor 17 rotate as one. Crankshaft 18 is rotatably supported by main bearing 41 and sub-bearing 42. Main bearing 41 is fixed to sealed case 11 by welding, and main bearing 41 and sub-bearing 42 are fastened by bolts to each other. In this sealed-type low temperature rotary compressor 40, main bearing 41 and sub-bearing 42 and cylinder 43 are components of compression machinery 13. Compression machinery 13 forms cylinder chamber 44 inside a cylinder 43 and between main bearing 41 and sub-bearing 42. Piston roller 45 is installed inside cylinder chamber 44 and is connected so as to be free to roll on crank 18a of crankshaft 18. Therefore, piston roller 45 can be rotated eccentrically inside cylinder chamber 44 by the rotation of crankshaft 18.

Cylinder chamber 44 formed inside cylinder 43 is divided into a suction side and a discharge side by a blade 46 operating as a vane. Blade 46 is free to slide in a blade groove 47 which is formed in cylinder 43. Blade 46 is pushed to the piston roller 45 side by a spring 48 which is formed on a rear side of blade 46, so the blade presses on the outer periphery of the roller.

Refrigerating machine oil 30 which lubricates and cools the compressor sliding members is stored in the lower part of sealed case 11. Refrigerating machine oil 30 is supplied to the sliding members of this sealed-type low temperature rotary compressor 40 via supply pipe 51 by oil pump 50, which is formed on the rear side of blade 46. The compressor sliding members comprise crankshaft 18, main bearing 41 and sub-bearing 42; piston roller 45 and main bearing 41 and sub-bearing 42; blade 46 and piston roller 45; blade groove 47 of cylinder 43 and blade 46. An at least quadrivalent ester oil synthesized from a fatty acid (carboxylic acid) and alcohol is used as refrigerating machine oil 30.

The refrigerant in the refrigerating cycle is drawn through suction piping 53 into cylinder chamber 44 of compression machinery 13. An HFC refrigerant, such as R134a, which has an ozone damage coefficient of zero and is environmentally friendly is used as the refrigerant for this sealed-type low temperature rotary compressor 40. The refrigerant drawn in from the suction side of cylinder chamber 44 is compressed by the rotation of piston roller 45, and is led to the inside of sealed case 11 via a discharge chamber 55 from a discharge port 54 which is provided on main bearing 41. After that, it is discharged into the refrigerating cycle from discharge pipe 56 passing through sealed case 11. The sealed-type rotary compressor 40 includes an oil cooler 57 which cools refrigerating machine oil 30. At the same time, the inside of sealed case 11 is cooled.

The operation of the sealed-type low temperature rotary compressor 40 will now be explained. When motor 12 of compressor 40 is turned on, motor 12 activates and rotates rotor 17 and crankshaft 18. Piston roller 45 which is fitted on crank 18a is rotated eccentrically by the rotation of crankshaft 18.

By piston roller 45 rotating eccentrically inside cylinder 43, the refrigerant, which is drawn in from the suction side of cylinder chamber 44, is gradually compressed. The compressed refrigerant is released to the inside of sealed case 11 from discharge port 54 via discharge chamber 55. Then, the compressed refrigerant is discharged from sealed case 11 into the refrigerating cycle via discharge pipe 56. Refrigerant which has circulated through the refrigerating cycle is drawn into cylinder chamber 44 from suction piping 53, and is provided for the next refrigerant compression operation.

Figure 3:
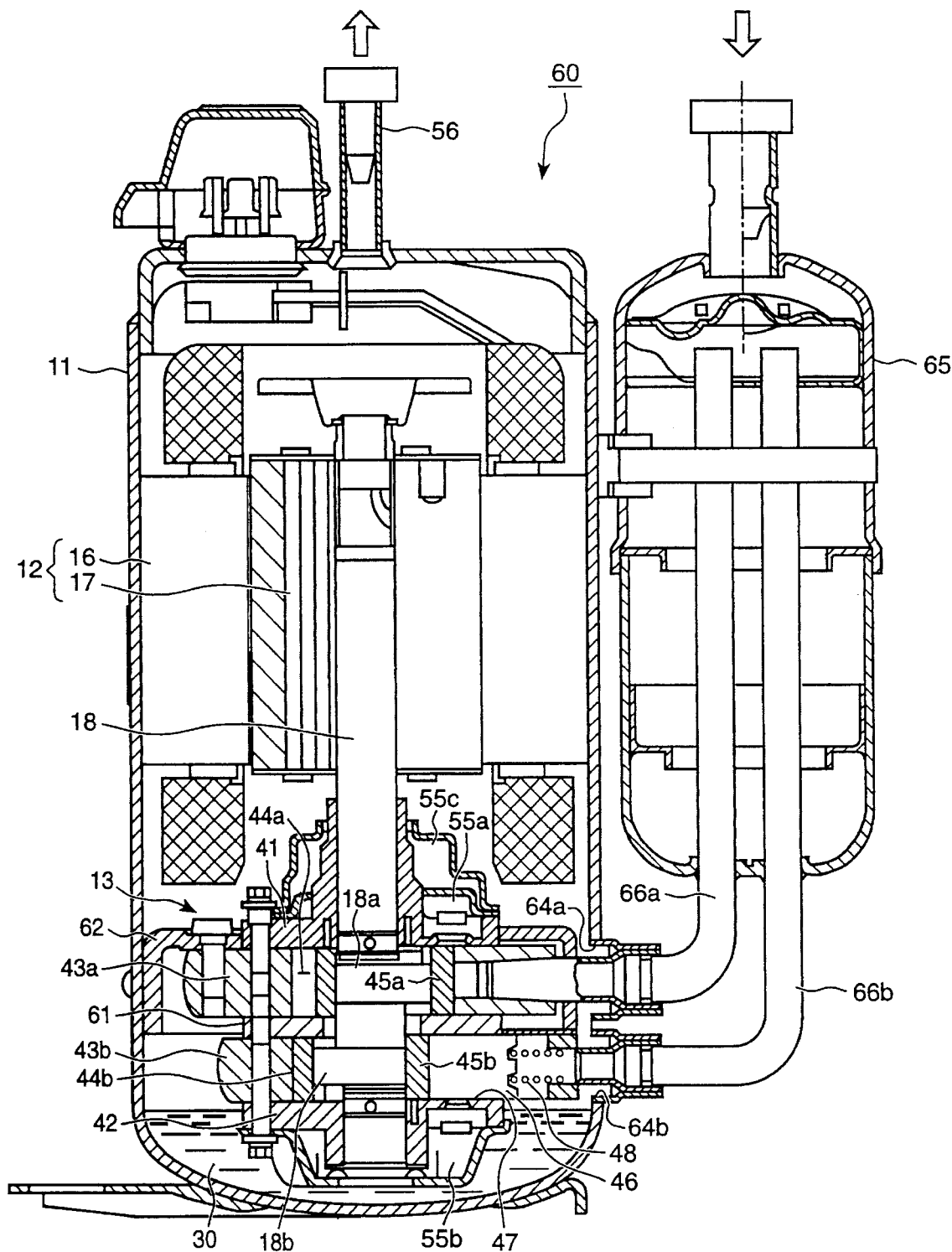
FIG. 3 is a vertical cross-sectional view of a sealed-type high temperature rotary compressor according to the invention.

FIG. 3 shows a vertically installed sealed-type high temperature rotary compressor 60. This sealed-type compressor 60 is used in the refrigerating cycle of an air conditioner. In FIG. 3, elements having the same functions as in the embodiments shown in FIGS. 1 and 2 are also indicated by the same reference numerals and may not be fully described. The high temperature rotary compressor 60 is a compressor in which the evaporation temperature of the refrigerant is 5° C. or more.

Sealed-type compressor 60 in FIG. 3 is a twin type rotary compressor which has two compression parts. Motor 12 and compression machinery 13 driven by motor 12 are installed inside sealed case 11. Motor 12 is positioned in the upper part and compression machinery 13 in the lower part, respectively. Motor 12 has stator 16 which is press-fitted into the upper part of sealed case 11 and rotor 17 which is rotatably provided in stator 16. Crankshaft 18 is firmly fitted in rotor 17 so that they rotate in one piece.

Crankshaft 18 is thrust through and extends above rotor 17 and is rotatablly supported by main bearing 41 and sub-bearing 42 of compression machinery 13. Compression machinery 13 has two cylinders (cylinder blocks) 43a, 43b. Piston rollers 45a, 45b are installed inside cylinder chambers 44a, 44b of each cylinder 43a, 43b. Piston rollers 45a, 45b are provided to pivot about cranks 18a, 18b of crankshaft 18. Piston rollers 45a, 45b are eccentrically rotated by the rotation of crankshaft 18.

A partition plate 61 forms a partition between cylinders 43a, 43b of compression machinery 13. Cylinder 43 on the main bearing 41 side is secured to fixed frame 62. Fixed frame 62 is fixed to the inner circumference of sealed case 11 by welding. Each cylinder chamber of cylinders 43a, 43b is divided into a suction side and a discharge side by a blade 46. Blades 46 are slidablly provided in blade grooves 47 formed in each cylinder 43a, 43b. They are normally spring-energized to the piston-rollers 45a, 45b sides by springs 48. However, in FIG. 3, only one blade 46, spring 48 are shown. Suction through-holes 64a, 64b are formed facing each cylinder 43a, 43b. Suction pipes 66a, 66b from one accumulator 65 are respectively linked to the intake holes of each cylinder 43a, 43b via suction through-holes 64a, 64b.

The HFC refrigerant drawn in through suction pipes 66a, 66b is drawn into the suction side of each cylinder chamber 44a, 44b of compression machinery 13, and the compression operation is performed. The refrigerant which is compressed in cylinder chambers 44a, 44b is discharged into second discharge chamber 55c, from each discharge chamber 55a, 55b. Then, the compressed refrigerant is discharged into sealed case 11 from second discharge chamber 55c. After this, the compressed refrigerant is discharged to the refrigerating cycle outside sealed case 11 via discharge pipe 56.

The sliding members of this compressor 60 are composed of crankshaft 18 and main bearing 41 and sub-bearing 42; piston roller 45a and main bearing 41; piston roller 45a and sub-bearing 42; each piston roller 45a, 45b and partition blade 61; blades 46a, 46b and piston rollers 45a, 45b; blades 46a, 46b and blade grooves 47 of cylinders 43a, 43b. Refrigerating machine oil 30 is filled under compression machinery 13.

In this sealed-type compressor 60 also, the same type of compression operation is performed as in the low temperature sealed-type rotary compressor 40 shown in FIG. 2.

Figure 4:
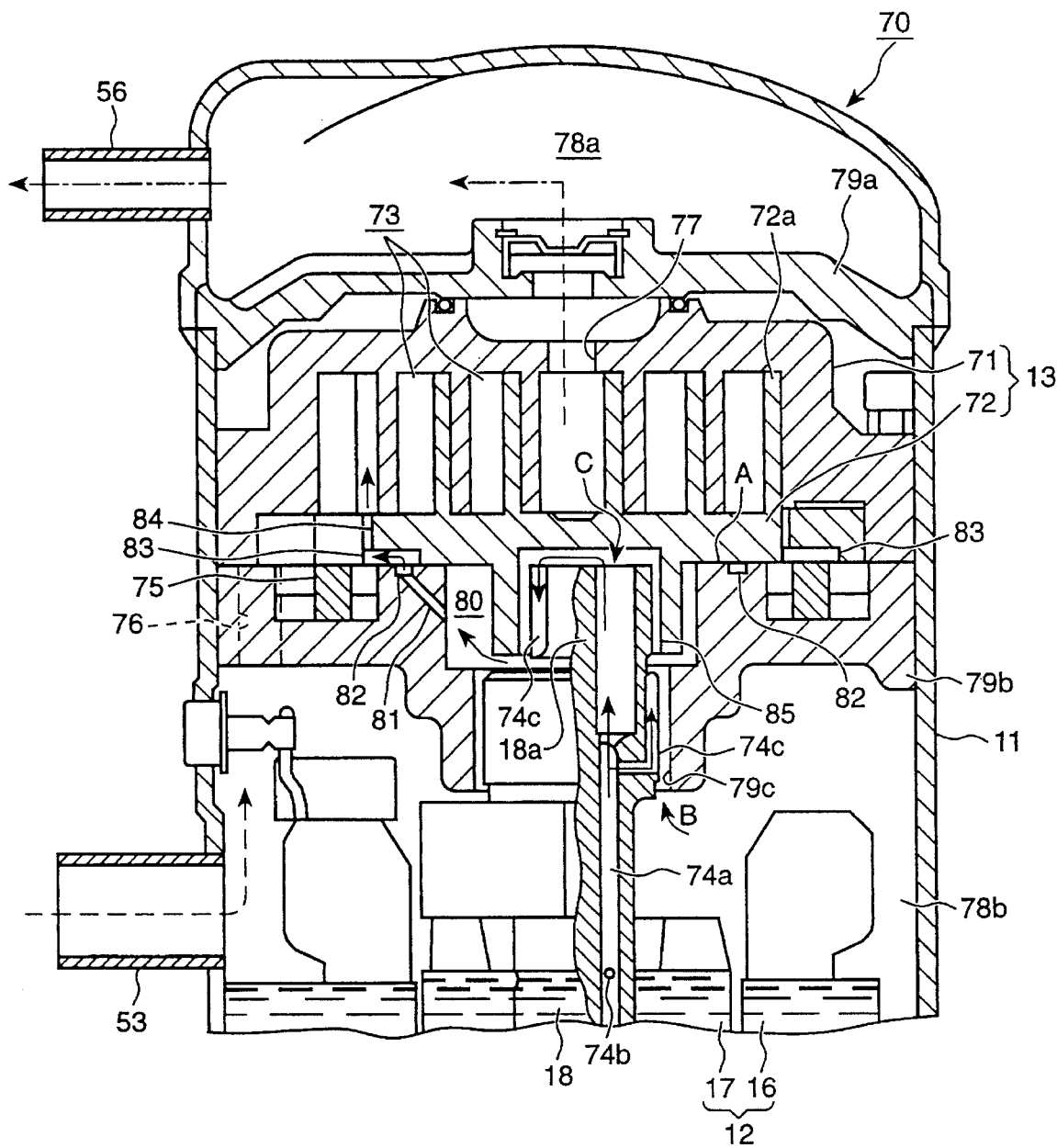
FIG. 4 is a vertical cross-sectional view of a sealed-type scroll compressor according to the invention.
Figure 5:
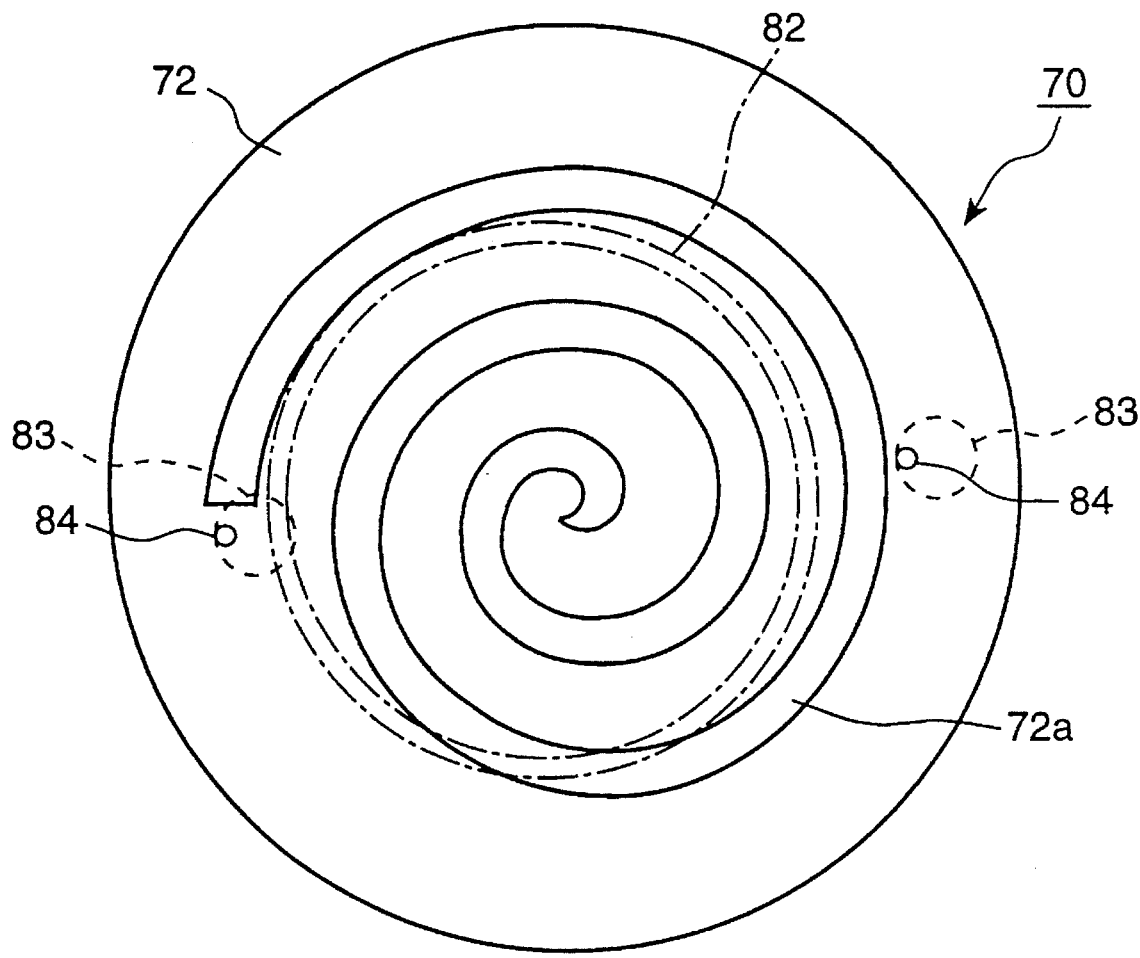
FIG. 5 is a plan view of a swivelling scroll provided in the scroll compressor shown in FIG. 4.

FIGS. 4 and 5 show another sealed-type of compressor. The compressor is a sealed-type scroll compressor 70. Scroll compressors such as sealed-type scroll compressor 70 are utilized in the refrigerating cycles of large-air conditioners and the like. Motor 12 and scroll type compression machinery 13 driven by motor 12 are installed inside sealed case 11. Motor 12 is positioned in the lower part of sealed case 11 and compression machinery 13 is positioned in the upper part of sealed case 11, respectively.

Motor 12 has stator 16, which is fixed to sealed case 11, and rotor 17 which is located inside the stator. Crankshaft 18 is axially fitted in rotor 17 as its rotation shaft and rotates as one with it. Crankshaft 18 is rotatablly supported by bearing part 79c of lower fixed frame 79b which is air-tightly fixed to sealed case 11. Crankshaft 18 projects above lower fixed frame 79b. Crank 18a is formed in the projecting part of crankshaft 18. Compression machinery 13 has a fixed scroll 71, which is fixed to sealed case 11 and pushed downwardly by upper fixed frame 79a which is fixed to sealed case 11, and swivelling scroll 72 which swivels against fixed scroll 71. Refrigerant is compressed in a compression chamber 73 formed by assembling the two scrolls 71 and 72. Swivelling scroll 72 is axially and rotatablly mounted on crank 18a of crankshaft 18. Oldham's ring 75 is fitted as an Oldham's coupling between swivelling scroll 72 and lower fixed frame 79b. Therefore, swivelling scroll 72 does not autorotate following the swivelling motion of swivelling scroll 72 which follows the rotation of crankshaft 18. Lower fixed frame 79b receives the thrust load of swivelling scroll 72 via Oldham's ring 75. Upper fixed frame 79a and lower fixed frame 79b divide the space in sealed case 11 into discharge chamber 78a and suction chamber 78b.

Suction piping 53 is provided in the middle of sealed case 11. HFC refrigerant is drawn in sealed case 11 passing through suction piping 53 from refrigerating cycle. The refrigerant drawn into suction chamber 78b formed under lower fixed frame 79b in sealed case 11 is led to compressor chamber 73 of compression machinery 13 via a suction path 76. The refrigerant is compressed in compression chamber 73 by changing the volume of compression chamber 73 according to the swivel rotation of swivelling scroll 72 caused by the rotation of crankshaft 18. The compressed refrigerant is guided toward the central part of fixed scroll 71 and is fed to discharge chamber 78a from a discharge port 77 which is formed in this central part. Then, the compressed refrigerant is discharged to the refrigerating cycle from sealed case 11 via discharge pipe 56. Discharge chamber 78a is formed by sealed case 11 and upper fixed frame 79a.

The refrigerating machine oil (not shown) which lubricates the compressor sliding parts is stored in the bottom of sealed case 11. This refrigerating machine oil is pumped to the compressor sliding members by an oil pump (not shown) provided in the lower part of crankshaft 18. An at least quadrivalent ester oil, which has excellent compatibility with the HFC refrigerant, is used in refrigerating machine oil for this sealed-type scroll compressor 70.

A crankshaft oil path 74a is provided in the center of crankshaft 18. An oil supply hole 74b is drilled from an outer surface of crankshaft 18 to crankshaft oil path 74a. In this sealed-type scroll compressor 70, the sliding members include crankshaft 18 with the bearing part 79c of lower fixed frame 79b, and crank 18a of crankshaft 18 and a pivot 85 of swivelling scroll 72. Oil supply channels 74c are provided at crank 18a outer surface and opposite of bearing part 79c. Therefore, refrigerating machine oil entering into crank shaft oil path 74a from oil supply hole 74b is delivered to between crankshaft 18 and bearing part 79c, and between crank 18a and pivot 85 of swivelling scroll 72 by oil supply channels 74c. Then, refrigerating machine oil is led to a ring-shaped space 80 which is formed by the upper surface of lower fixed frame 79b. Part of the refrigerating oil supplied to ring-shaped space 80 is led to thrust receiving surface A of fixed frame 62 by oil supply hole 74b provided in fixed frame 62.

A ring-shaped oil groove 82 is formed in thrust receiving surface A of fixed frame 62. The refrigerating machine oil supplied to thrust receiving surface A is accumulated in ring-shaped oil groove 82. First and second circular pits 83 are provided on the under surface of swivelling scroll 72. Through-holes 84 which pass through to the upper surface of swivelling scroll 72 are formed in these first and second circular pits 83. Through-holes 84 are provided in eccentric positions in first and second circular pits 83 as shown in FIG. 5. One through-hole 84 is positioned at the end of the wrapped spiral of a vane 72a of swivelling scroll 72.

Swivelling scroll 72 swivels eccentrically in relation to fixed frame 62. The two circular pits 83 alternately link through to ring-shaped oil groove 82 following the swivelling motion of swivelling scroll 72 as shown in FIGS. 4 and 5. Therefore, refrigerating oil led to thrust receiving surface A by an oil supply hole 81 is supplied to between swivelling scroll 72 and fixed scroll 71. Consequently, refrigerating machine oil raised by the oil pump is supplied to all compressor sliding members.

The operation and series of flowing refrigerant machine oil of this sealed-type scroll compressor 70 will be explained. In compressor 70, when motor 12 activates, rotor 17 and crankshaft 18 rotate. Swivelling scroll 72 rotates eccentrically, without autorotation, through the rotation of crankshaft 18, and performs swivelling (scroll) operation in relation to fixed scroll 71.

By this swivelling operation, HFC refrigerant which has been guided to compression chamber 73 of compression machinery 13 from suction piping 53 via suction path 76 in sealed case 11, undergoes a compression operation. At this time, compression chamber 73 formed by fixed scroll 71 and swivelling scroll 72 shifts diametrically toward the center of fixed scroll 71 while swivelling. At the time of this shift, it performs a compression operation on the refrigerant by shifting while contracting in volume, and the refrigerant is discharged from discharge port 77 formed in the central part of fixed scroll 71 to discharge pipe 56 via discharge chamber 78a.

At the same time, by the operation of sealed-type scroll compressor 70, refrigerating machine oil 30 stored in the bottom of sealed case 11 is raised to crankshaft 18 by the action of an oil pump which operates by the drive of motor 12. It is supplied to sliding parts B and C of crankshaft 18 by passing through crank shaft oil path 74a, oil supply hole 74b and oil supply channels 74c.

Refrigerating machine oil 30 which has lubricated each sliding part B and C of crankshaft 18 is led to ring-shaped space 80 by passing along oil supply channels 74c. Then, it passes through oil supply hole 81 and is supplied to ring-shaped oil groove 82 of thrust receiving surface A. Part of the refrigerating machine oil 30 supplied to oil supply groove 82 is used for lubricating this thrust receiving surface A. The remainder of the lubricating oil passes through first and second circular pits 83 and through holes 84 is supplied to the outer periphery of the upper surface of swivelling scroll 72. This lubricating oil, together with the refrigerant for compression which has been drawn into compression chamber 73 of compression machinery 13, is led to the central parts of fixed scroll 71 and swivelling scroll 72. Thus, it is used to lubricate the sliding parts of fixed scroll 71 and swivelling scroll 72.

In sealed-type scroll compressor 70, by providing compression chamber oil supply hole 82 which is a ring-shaped groove, good lubrication action can be performed by deliberately supplying refrigerating machine oil inside compression chamber 73. In particular, refrigerating machine oil 30 is supplied in amounts which correspond to the number of rotations of swivelling scroll 72. Thus, the sliding parts of fixed scroll 71 and swivelling scroll 72 can be appropriately lubricated.

Figure 6:
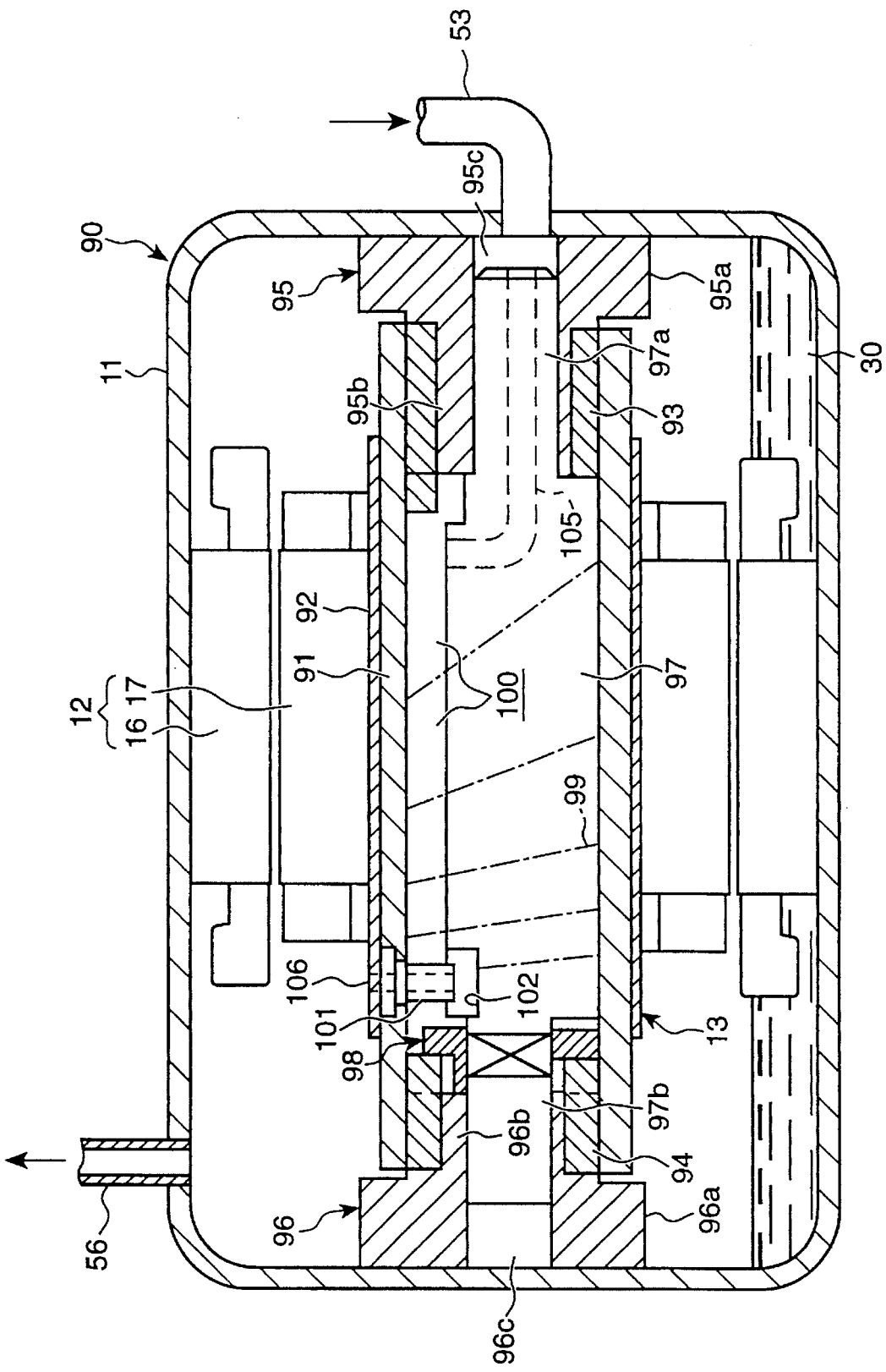
FIG. 6 is a vertical cross-sectional view of a sealed-type helical compressor according to the invention.

FIGS. 6 and 7 show a sealed-type helical compressor 90. Helical compressor 90 comprises a motor 12 and compression machinery 13 installed in sealed case 11. A feature of these helical compressors is that motor 12 and compression machinery 13 are assembled as one as shown in FIG. 6. Motor 12 has stator 16 fixed inside sealed case 11, and rotor 17 which is housed in stator 16. A cylinder 91 of compression machinery 13 is fixed to rotor 17 of motor 12 via a cylinder cover 92. Thus, cylinder 91, rotor 17 and cylinder cover 92 rotate as one. That cylinder 91 operates as the shaft of rotor 17. Both ends of cylinder 91 are open, and it is supported by a main bearing 95 and a sub-bearing 96 via sleeve-shaped metal cylinder bearings 93 and 94.

A piston 97 is installed inside cylinder 91. The rotation of cylinder 91 is transmitted to piston 97 via an Oldham's coupling 98. Part of the external peripheral wall of piston 97 is in contact with the inner peripheral wall of cylinder 91 along the axial direction. A spiral blade groove (not shown) is formed in piston 97 which gradually becomes smaller in pitch from one end to the other. A spiral-shape helical blade 99 is fitted into this blade groove. Spiral-shape helical blade 99 can move in the centrifugal direction of piston 97 in blade groove. A main bearing member 97a is provided incorporated with piston 97 at one end in the axial direction, and sub-bearing member 97b is incorporated at the other end. These two bearing members 97a, 97b are rotatablly supported by inserting them in supporting holes 96c, 95c formed at eccentric positions in main bearing 95 and sub-bering 96, respectively. Main bearing 95 and sub-bearing 96 have flanges 95a and 96a which are fixed to sealed case 11 and bearing bosses 95b and 96b which are incorporated with a projection from these flanges. Sleeve-shaped metal cylinder bearings 93 and 94 are rotatablly supported by bearing bosses 95b and 96b.

The space between cylinder 91 and piston 97, which are part of compression machinery 13, is divided into multiple spaces in the axial direction by spiral-shaped helical blade 99. Thus, multiple compression chambers 100 are formed inside cylinder 91 which gradually becomes smaller in volume from one end of helical blade 99 to the other, that is to say from the refrigerant suction side toward the discharge side.

A blade stopper 101 projects at one side of cylinder 91 to prevent helical blade 99 from sliding in the axial direction with the rotation of cylinder 91 and piston 97. Blade stopper 101 is provided in the vicinity of Oldham's coupling 98, and faces a concave 102 which is provided at the end of piston 97.

As shown in FIG. 7, Oldham's coupling 98 has an Oldham's ring 104 capable of sliding in the diameter direction as one with the rotation of sleeve-shaped metal cylinder bearing 94 which is provided on and rotates as one with cylinder 91. Oldham's unit 97c of piston 97 is linked to and rotates as one with Oldham's ring 104. The mechanism transmits the rotational force of cylinder 91 to piston 97.

A suction piping 53 which is connected to refrigerating circuit is provided at one side of sealed case 11. HFC refrigerant which has been drawn in from suction piping 53 is led to multiple compression chambers 100 of compression machinery 13 by passing through supporting hole 95c, which is provided at the center of main bearing 95, and a suction path 105 of piston 97. Compression machinery 13 is driven by motor 12, and a compression operation is performed on the refrigerant which has been led to multiple compression chambers 100 by the rotation of cylinder 91 together with piston 97.

In compression machinery 13 which is composed of cylinder 91, piston 97 and helical blade 99, HFC refrigerant is compressed by the displacement of multiple compression chambers 100 in the axial direction. The compressed refrigerant is released into sealed case 11 via a refrigerant outlet hole 106 which is formed in blade stopper 101. Then, the refrigerant is discharged from discharge pipe 56 to refrigerant cycle.

In this sealed-type compressor 90, the compressor sliding parts are lubricated by refrigerating machine oil 30 which is led to the compressor sliding members by an oil pump (not shown). Refrigerating machine oil 30 is stored in the lower part of sealed case 11. An at least quadrivalent ester oil having excellent compatibility with HFC refrigerant is used for refrigerating machine oil 30. The sliding members of the compressor include the blade groove of piston 97 and helical blade 99; Oldham's ring 104 of Oldham's coupling 98, sleeve-shaped metal cylinder bearings 93 and 94, main bearing 95 and sub-bearing 96; the shaft part of piston 97, and main bearing 95 and sub-bearing 96.

The results of respective testing and assessment of the above described sealed-type compressors 10, 40, 60, 70 and 90 will be explained. In the columns of the refrigerant machine oil in tables shown in FIGS. 8, 9, 14, 15, 16, 18, 19 and 20, "3" means trivalent ester oil, and "4" means a quadrivalent ester oil.

The Table shown in FIG. 8, presents data relating to sealed-type reciprocating compressor 10 and sealed-type scroll compressor 70. These compressors were connected in an ordinary closed refrigerating cycle of air conditioner which includes a four-way valve, indoor heat exchanger, expansion device, and outdoor heat exchanger. The refrigerating cycle used HFC refrigerant and the refrigerating machine oils were varied. Each of motors 12 of compressors 10, 70 was supplied variable frequency (16 Hz to 90 Hz) alternative current from an inverter circuit. Each air conditioner continuously operated in heating air conditioning mode for 1000 hours. Then, actual machine tests to assess wear of the compressor sliding parts and contamination were performed. The results are set forth in FIG. 8. For the contamination assessment, the amount of sludge adhesion to expansion device, such as the capillary tube and the expansion valve, in the refrigerating cycle was assessed.

In sealed-type reciprocating compressor 10, wear assessments and contamination assessments were made of the sliding parts of connecting rod 20 and crankshaft 18 as examples of compressor sliding members. Connecting rod 20 was established as one sliding member, and crankshaft 18, which was the partner material, was established as the other sliding member. For connecting rod 20, aluminum material was taken as the parent material (main body), in which its surface had been alumite treated by anodization, was used. Carbon steel such as S45C (in Japanese Industrial Standard: JIS) was used in crankshaft 18.

In sealed-type scroll compressor 70, wear assessments and contamination assessments were made of the sliding parts of swivelling scroll 72, which was a vane, and Oldham's ring 104 as compressor sliding parts. One of the sliding members taken was vane 72a of swivelling scroll 72, and the other sliding member taken was Oldham's ring 104. For swivelling scroll 72, in the same way as above described for the connecting rod 20 of sealed-type reciprocating compressor 10, aluminum material was taken as the parent material, and the surface was alumite treated. On the other hand, carbon steel such as S45C (JIS) was used for Oldham's ring 104.

In the wear assessment by the actual machine tests, a 5-step assessment was made. The various indicators in the tables are:

[Star]—"No Wear", the amount of wear being 1 μm or less;

[double circles]—"No Wear", the amount of wear being 5 μm or less;

[circle]—"Normal Wear of 10 μm or less";

[triangle]—"Heavy Wear and Scratches", the amount of wear being 20 μm or less;

[x]—"Scratches and Much Adhesion", the amount of wear being 20 μm or more. Here, "Adhesion" is a state in which the sliding members stick to each other.

The [circle] and above show preferable sliding materials for making actual operation possible.

For the sludge (contamination) assessment, a 4-step assessment was made. The indicators in the tables are as follows:

[double circles]—"The amount of sludge adhesion in the refrigerating cycle is extremely small and no problem to use";

[circle]—"The amount of sludge adhesion is small, which is good in actual use an no problem";

[triangle]—"Normal in actual use and no problem";

[x]—"The amount of sludge adhesion is large and there is a problem".

In Example 1, assessment tests were performed using an HFC single refrigerant of R134a and an HFC mixed refrigerant of R32 (25 wt %)/R125 (25 wt %)/R134a (50 wt %) for refrigerants in the refrigerating cycle, and using a trivalent ester oil and a quadrivalent ester oil as refrigerating machine oils. The assessment test result is shown in FIG. 8.

It was found that the examples which used the quadrivalent ester oil were good, in that the amounts of wear were normal wear and the sludge adhesions were also small by the assessment test results. On the other hand, it was found that there was a problem with the examples which used the trivalent ester oil as the refrigerating machine oil, in that amounts of wear were large in all the wear assessments.

As shown in Comparative Examples 1 to 3, it was found that, in the comparative examples which used aluminum material in one of the sliding members of the compressor sliding parts of the sealed-type compressor and used aluminum material or carbon steel such as S45C (JIS) in the other sliding member, the wear was heavy in each case. Even if they used an HFC refrigerant (R134a refrigerant or R32/R125/R134a mixed refrigerant) and a quadrivalent ester oil, they were found to be unsatisfactory on the point of wear assessments.

From Example 1, it was found that, in the compressor sliding parts of sealed-type reciprocating compressor and sealed-type scroll compressor 10 and 70 which used HFC refrigerants, in the case aluminum material was used in one of the sliding members which was a sliding material, if this was alumite treated and the other sliding member was taken as carbon steel and a quadrivalent ester oil was used as the refrigerating machine oil, the lubrication property improved and the wear resistance became better. Therefore, this combination can be used in actual use with no problem.

A quadrivalent ester oil is a synthetic oil synthesized from a fatty acid and a quadrivalent alcohol (pentaerythritol). However, the lubrication property differs according to the number of ester bonds in the ester oil, which is determined by the number of OH groups of the fatty acid. Compared with a trivalent ester oil and ester oil in which the number of ester bonds is less than a trivalent ester oils a quadrivalent ester oil has more ester bonds as functional groups. Therefore, its bonding power with the sliding members in the compressor sliding members is higher, and the wear resistance of these sliding members is improved. If an ester oil which is quinquevalent or more is used, the manufacturing cost will be 10 to 20 times higher than that of a ordinary mineral oil. However, if this cost can be disregarded, a further improvement in bonding power can be expected.

When one of the sliding members of the compressor is made of aluminum, its weight and therefore its inertia is reduced. Therefore, reduction of surface pressure on the sliding surface can be designed, and energy loss can be reduced.

Surface treating one of the compressor sliding members with alumite treatment makes small holes in the alumite layer on the surface of the sliding members. Thus, ester oil can be stored in the small holes, the adsorption, sliding property and oil retention property of ester oil in relation to aluminum material can be improved, and the sliding state can be made better. Therefore, loss of oil on the sliding surface, fusion and abnormal wear can be prevented, and long-term stable operation can be guaranteed with the use of HFC refrigerant.

With the sealed-type compressor used in examples 2 to 5 also, continuous actual machine tests were carried out for 1000 hours respectively on sealed-type reciprocating compressor 10 and sealed-type scroll compressor 70, under the same operating conditions as in example 1. Wear assessments and sludge assessments were performed. These test results are presented in the Table in FIG. 9.

HFC refrigerants (R134 single refrigerant or R32/R125/R134a mixed refrigerant) were used as the refrigerants. Compressors were used in which aluminum material was used as the material for one of the sliding members (the connecting rod 20 of sealed-type reciprocating compressor 10, and the vane 72a (swivelling scroll 72) of sealed-type scroll compressor 70), and the surfaces were alumite treated. After this, the surface was further treated with molybdenum sulfide (MoS$_2$). In such cases, even if vanadium material (Example 2), carbon steel such as S45C (JIS) (Example 3), or carbon steel surface treated by nitride treatment (Example 4) was used for the other sliding member (crankshaft, Oldham's ring) which was the partner material, when quadrivalent ester oil was used as the refrigerating machine oil, it was found that the wear assessments and sludge (contamination) assessments were good and desirable. Regarding the amount of wear, it was found that it became sequentially less from Example 2 to Example 4. On the other hand, in the case of using trivalent ester oil, it was inferior on the point of wear assessment in all cases, and was therefore found to be undesirable.

As stated in Example 5, the surface of one of the sliding members (connecting rod or vane) was alumite treated and then further surface treated with PTFE (polytetrafluoroethylene). In this case, even when cast iron such as FC2000 (JIS) was used for the other sliding member (crankshaft or Oldham's ring) which was the partner material, when quadrivalent ester oil was used as the refrigerating machine oil, it was found that the wear assessment and the contamination assessment were both good. Trivalent ester oil was inferior on the point of wear assessment, and was undesirable.

In the sealed-type compressors which use HFC refrigerants stated in Tests 2 to 5, aluminum material is made the parent material as one of the sliding members. After the surface of this has been alumite treated, molybdenum sulfide or PTFE surface treatment is carried out. In these cases, when quadrivalent ester oil is used as the refrigerating machine oil, self-lubrication can be increased by the formation of a lubricating film on one of the sliding surfaces. Thus, a good lubrication state can be maintained, and loss of oil on the sliding surface, fusion and abnormal wear can be effectively prevented. Aluminum material, carbon steel, cast iron, or carbon steel on which nitride treatment has been carried out can be used for the other sliding member as the partner material. By carrying out nitride treatment on carbon steel, its surface hardness can be improved, and therefore the amount of wear can be reduced.

The sealed-type compressors in Examples 6 and 7 were rotary compressors. Wear assessments of the compressor sliding parts were performed by continuous operation for 1000 hours at an high operating frequency, or 90 Hz, with pressure conditions of discharge pressure 2.5 MPa and suction pressure 0.5 MPa. In the sealed-type rotary compressors of Examples 6 and 7 one of the sliding members of the compressor was taken as crankshaft 18, and the other sliding as bearings 41 and 42. In Example 6, a cast material of globular graphite cast iron with a predetermined ferrite ratio, and in Example 7, a cast material of flaky graphite cast iron with a predetermined ferrite ratio, were respectively used for the shaft material in one sliding member. In Example 6 and 7, for the bearings of the other sliding members, which are the partner materials, a flaky graphite cast iron equivalent to FC250 (JIS) were used as the bearing material. Furthermore, in these rotary compressors, R134a HFC refrigerant was used as the refrigerant, and a quadrivalent hindered ester oil with an additive was used as the refrigerating machine oil.

Figure 10:
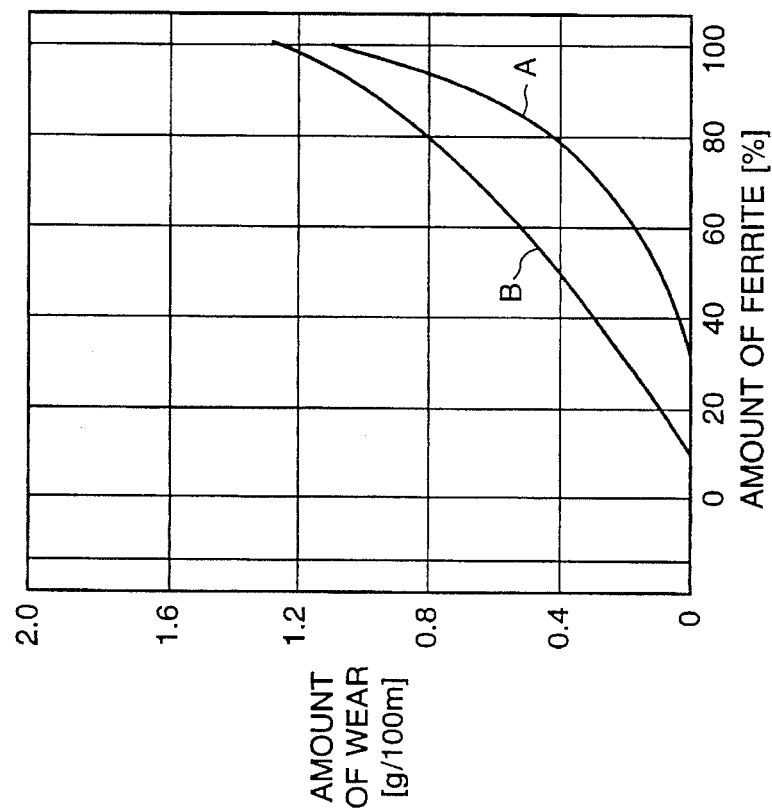
FIG. 10 is a table of the amounts of wear of compressor sliding members of the sealed-type compressors obtained by Examples 6 and 7.

The test results collated are shown in the graph in FIG. 10. The amount of wear was taken as the sum of the amounts of wear of crankshaft 18 and bearings 41, 42. As the result of assessment tests which were performed by multiple alterations of the ferrite ratio, the relationship between the amount of ferrite in the one sliding member of the compressor sliding parts and the amount of wear is shown by line A in FIG. 10 when globular graphite cast iron is used for the one sliding member. Line B in FIG. 10 shows the case when flaky graphite cast iron is used. It can be seen that, if globular graphite cast iron is used, the amount of wear increases when the amount of ferrite is 40% or more. Also, it can be seen that, with flaky graphite cast iron, the amount of wear increases rapidly when the amount of ferrite is 15% or more.

Therefore, by using globular graphite cast iron with a ferrite ratio of 40% or less, or flaky graphite cast iron with a ferrite ratio of 15% or less, for one of the sliding members which compose the compressor sliding parts, shaft wear can be effectively prevented. For the other sliding member, which is the partner material, not only flaky graphite cast iron, which has a self lubrication property, but also globular graphite cast iron, which has a self-lubrication property together with great rigidity, may be used.

Also, the rigidity of the shaft material can be increased by using globular graphite cast iron in the shaft material. Thus, it can become a shaft material which is applied to refrigerating machine, for example air conditioner, which has an inverter circuit to rotate the motor of compressor at low speed to high speed rotation. Thus, any unbalance which occurs in the sliding part of the shaft material will become a large unbalanced force at high speed rotation. It is required that the shaft material have high rigidity. Therefore, materials which use globular graphite cast iron in one sliding member and use flaky or globular graphite cast iron in the other sliding member are appropriate for the compressor sliding parts of the compressors in using under high speed rotation. The globular graphite cast iron and the flaky or globular graphite cast iron can be applied to crankshaft 18 and bearing 19 of the sealed-type reciprocating compressor 10 (shown in FIG. 1), to crankshaft 18, main bearing 41 and sub-bearing 42 of sealed-type rotary compressor 40 (shown in FIGS. 2 and 3), to crankshaft 18 and bearing part 79c of sealed-type scroll compressor 70 and to piston 97, main bearing 95 and sub-bearing 96 of sealed-type helical compressor 90. In the case of using flaky graphite cast iron in the shaft material, it can be appropriate to apply to refrigerating cycle in which motor of compressor is operated at commercial power supply wherein frequency is 50 or 60 Hz. Shaft wear is prevented by the self-lubrication property due to the graphite contained in the flaky graphite cast iron.

Figure 11:
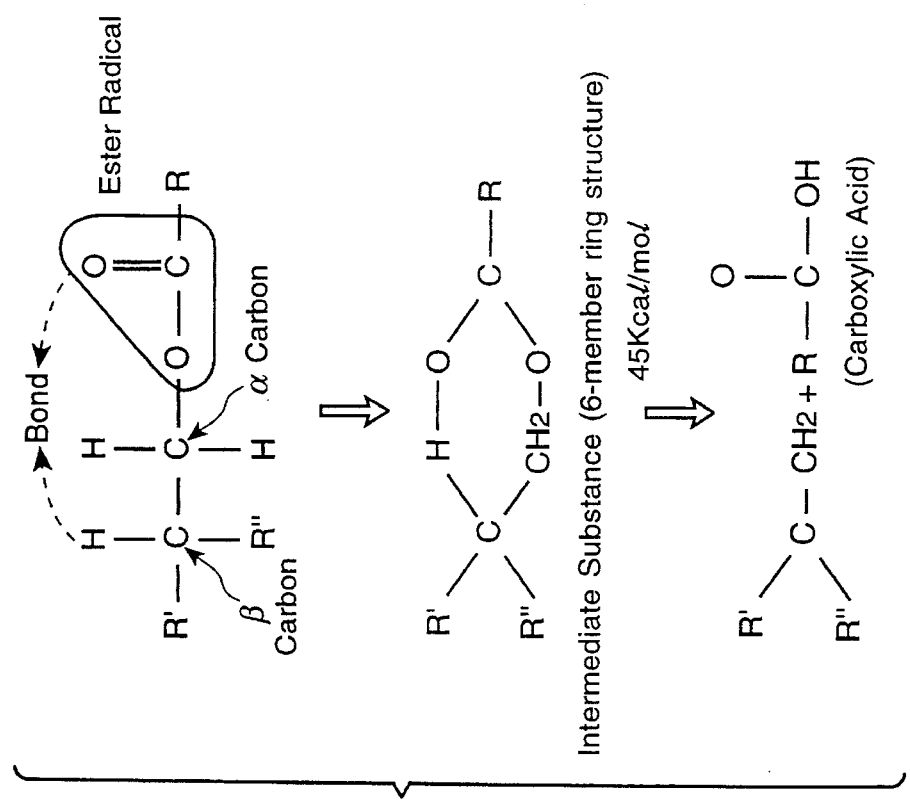
FIG. 11 is a diagram illustrating the process by which carboxylic acid is produced from nonhindered-type alcohol.

Furthermore, by using a quadrivalent hindered ester oil in which there is an additive as the refrigerating machine oil, the thermal stability can be improved and the heat resistance can be improved. In non-hindered type alcohol, as shown in FIG. 11, the hydrogen atom bonded to the, $\beta$ carbon bonds with the oxygen in the ester bonds. Thus, it is easy to produce carboxylic acid at low energy (45 Kcal/mol) via a 6-member ring-structured intermediate body, and it lacks thermal stability. However, hindered ester oil, which is produced by using hindered alcohol, has no hydrogen bonded to the $\beta$ carbon of the alcohol side of the ester bond. Therefore, it cannot take up a 6-member ring structure, and the production of carboxylic acid by a low-energy thermal decomposition reaction is prevented. Thus, hindered ester oil has high thermal stability.

As shown in FIGS. 8 and 9, quadrivalent ester oil has a tendency to reduce the amount of wear and the amount of sludge (contamination) compared with trivalent ester oil. Further more, when a quadrivalent hindered ester oil, which is produced by using hindered alcohol, is used as refrigerating machine oil, the lubrication and wear resistance can be improved by its high thermal stability and heat resistance. Additives, such as stabilizers and antioxidants and copper deactivators are selectively added to quadrivalent hindered ester oils, but extreme-pressure additives are not added.

The purpose of adding a stabilizer is to capture the acid produced from hydrolysis (the acid produced by the hydrolysis of the ester oil) due to moisture penetration and the penetrating water itself. The oxidation stability of ester oil is excellent compared with that of mineral oil. However, it has high hygroscopicity, thus, ester oil tends to cause oxidation attributable by the hygroscopicity. When the sealed-type compressor is stored before the compressor connects to refrigerating cycle, it is possible that air including water as vapor enter into the compressor. Therefore, the antioxidant is added in the ester oil for preventing oxidation terioration. Also, the purpose of the addition of a copper deactivator is forming a protective film in parts of the copper tubing of the refrigerating cycle where the activation energy is high. Then, the protective film can prevent the production of attachments of copper from high energy copper tubing portion in the refrigerating cycle.

However, there is a reason for not using an extreme-pressure additive. The ordinary phosphoric acid ester group extreme-pressure additives do not produce a lubricant film under HFC refrigerants because no chlorine atoms are present in the HFC refrigerant. So extreme-pressure additives cannot reach to the sliding surface by interference with the sliding surface adsorption of the ester oil itself. Thus, extreme-pressure additives have little effect. In rotary compressors, wear readily occurs between the blade 46 and piston rollers 45, 45a, 45b due to contact of the metals. When attempting to increase the effect, it is necessary to increase the extreme-pressure additive concentration. However, high extreme-pressure additive concentration causes corrosion (wear). Consequently, extreme-pressure additive should not be used in the HFC refrigerant.

For stabilizers, epoxy compounds are used, and 0.2 to 0.8 wt % of stabilizer is added to a quadrivalent hindered ester oil. The use of more stabilizer would reduce the volume resistivity of the ester oil, therefore, an addition amount within limits which will satisfy the electrical insulation resistivity of the product (for example 0.5 wt %) is selected. The stabilizer captures more acid than the moisture (water) in the oil. However, under no acid condition, it can capture a predetermined amount (for example 500 ppm) of the moisture.

To provide an antioxidant, DBPC (dibutyl paracresol). 0.1 to 0.5 wt % is added in the quadrivalent hindered ester oil. With addition of 0.1 wt % of DBPC, the antioxidant survival rate can be held at 100% for a year of storage at normal temperature.

To provide a copper deactivator, BTA (benzo triazol). 5 to 20 ppm is added. The amount of copper deactivator added is determined by calculating the total copper surface area inside the refrigerating cycle.

Figures 12, 13:
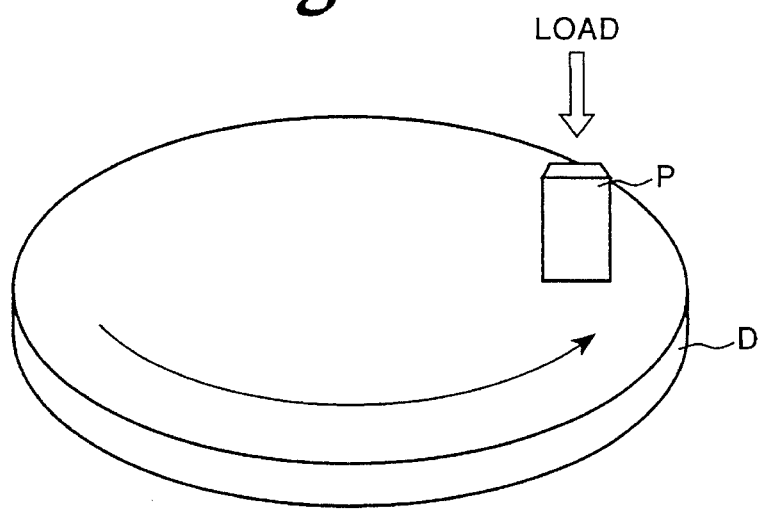
FIG. 12 is a table of material properties of compressor sliding members.
FIG. 13 is a simplified diagram showing the principle of the friction wear tester for sliding members.

FIG. 12, is an assessment from a different viewpoint of the material characteristic values of the sliding members used in the sealed-type compressors. In this assessment test, the characteristic values of the materials of the sliding members were assessed, not by an actual machine test, but by a table test assessment test using the friction wear tester shown in FIG. 13.

In the friction wear tester, pin P, which is one sliding member, is pressed with the required load on disc D, which is the other sliding member, in an atmosphere of HFC refrigerant. Trivalent ester oil or quadrivalent ester oil is sprayed on the sliding parts of pin P and disc D, and the amounts of wear of pin P and disc D are measured.

In Modification 1, for pin P which was one of the sliding members, sintered material forging, such as SMF4 (JIS) which is included SMF4020, SMF4030, SMF4040 and SMF4050, in which Cu was 1.0 wt %, C was 0.8 wt % and the remainder was Fe, hardened by steam treatment and with a density ratio of 88%, was used as the material. For the disc, which was the other sliding member, cast iron containing Mo—Ni—Cr was used. In this application, the density ratio is the ratio of the volume excluding holes to the overall volume of the material.

With a pin material with a density ratio of the sliding member of less than 95% as in Modification 1, the amount of water retained in the material is large, and water expulsion cannot be performed effectively. When ester oil is used in the refrigerating machine oil, a reversible reaction (hydrolysis), which produces a fatty acid, occurs in the presence of moisture (water). The ester oil itself deteriorates due to the fatty acid produced. Thus, the lubrication property reduces and it may be caused to accelerate deterioration of the organic materials inside the sealed-type compressor, such as polyethylene or PET as the motor electrical insulating material. Therefore, material with a density ratio of the sliding member of less than 95% cannot be used. The water retention of a material with a density ratio of 95% or more becomes ⅓ or less than that of a material with a density ratio of 70%, and water expulsion can be effectively performed.

In Modifications 2 and 3 a sintered material with a density ratio of 95% or more was used for pin P, which is one of the sliding members. Cast iron containing Mo—Ni—Cr was used in disc D, which is the other sliding member. Pin P of Modification 2 was a sintered material forging (SMF4) of Cu 2 wt %, C 0.8 wt % and the remainder Fe, into the surface of which Cu—Sn was infiltrated, and had a density ratio of 99%. Pin P of Modification 3 was a sintered material forging (SMF4) of Cu 2 wt %, C 0.8 wt % and the remainder Fe, into the surface of which Cu was infiltrated. Modification 3 also had a density ratio of 99%. In the sliding members of Modifications 2 and 3, the amounts of wear were very small, and it was found that they were desirable sliding materials.

When a sintered material of density ratio 95% or more is used in a sliding member, moisture expulsion can be effectively performed. Thus, deterioration of the ester oil can be effectively prevented. Furthermore, it is able to effectively prevent the moisture from penetrating into the holes by isolating the holes individually. Therefore, in the sintered material of density ratio 95% or more, its moisture expulsion function can be improved.

When one of the sliding members which compose the compressor sliding parts is formed of a ferrous alloy and it has been surface treated by infiltrating the surface with Cu—Sn or Cu, the retention of cooling water in the holes at the time of manufacture can be prevented. Thus, deterioration of the ester oil by hydrolysis can be effectively prevented.

On the other hand, when materials with density ratios of less than 95% are used in the sliding members which compose the compressor sliding parts, it is required to seal the holes. In using these materials, improvement of moisture expulsion and lubrication can be acquired by sealing of the holes with a self-lubricant such as PTFE, $MoS_2$, copper, tin or bronze. Thus, deterioration of the ester oil can be effectively prevented.

The table in FIG. 14 shows the assessment results for a sealed-type rotary compressor. The wear assessments and sludge (contamination) assessments indicated for Examples 8 and 9 and Comparative Examples 4 and 5 shown in FIG. 14 were obtained under the same conditions as those in FIG. 8.

The sealed-type compressors used in Tests 8 and 9 were low temperature rotary compressor 40 shown in FIG. 2 and high temperature rotary compressor 60 shown in FIG. 3. The results shown are wear assessments and contamination assessments after operating the compressors for 1,500 hours at a compressor temperature of 120° C. under pressure conditions of discharge pressure 2.5 MPa and suction pressure of 0.05 MPa. The refrigerants used for these sealed-type compressors were an HFC R134a single refrigerant or an HFC R32/R134a mixed refrigerant.

In Example 8, blade 46 was used in one of the sliding members which composed the compressor sliding parts, and the other sliding members were roller pistons 45, 45a, 45b. Iron containing Mo—Ni—Cr was used in roller pistons 45, 45a, 45b. In blade 46, at least the blade tip surface (sliding parts) was the surface of an SKH material, such as SKH51 which is a high-speed tool steel, and nitride treated and its surface at which its hardness was made a Vickers hardness (Hv) of Hv1000 or more.

In Example 9, a stainless steel (SUS material), such as SUS440C, was used in blade 46. At least the tip of blade 46 was nitride treated at which its surface hardness was made a surface hardness of Hv 1000 or more.

In the sealed-type compressors which used HFC refrigerants shown in Examples 8 and 9, at least the tip of blade 46 which was one of the sliding members of the compressor sliding parts was composed of an SKH material or an SUS material. By nitride treating the surface so as to give it a surface hardness of Hv 1000 or more, when a quadrivalent ester oil was used as the refrigerating machine oil, the amount of wear was very small, and a good sliding state could be obtained. However, when a trivalent ester oil was used, the amount of wear was large, and this was undesirable.

As shown by Comparative Examples 4 and 5, even if an SKH material or SUS material containing Cr is used for one of the sliding members (blade 46) of the compressor sliding parts of the sealed-type compressor. In this combination, if the surface hardness of the vane 72a is less than Hv 1000, there is normal wear with the conventional combination of refrigerant and refrigerating machine oil in which the HCFC R22 for the refrigerant and mineral oil for the refrigerating machine oil are used. However, in the case of using an HFC refrigerant and a quadrivalent ester oil, there was much wear, and this is undesirable.

That is to say, as shown in Examples 8 and 9, when the surface of one of the sliding members (blade 46) which composes the compressor sliding parts will have a surface hardness of Hv1000 or more through nitride treatment, the cutting wear of blade 46 can be extremely reduced. As shown by Comparative Examples 4 and 5 of the one sliding member, with materials of Hv 600 to 800, such as untreated surface SKH51 and SUJ2, cutting wear progresses, thus this is not desirable.

When blade 46 is composed of an SKH material or an SUS material which has nitride treating which makes a compound layer (surface layer) of 4 μm or more on the blade 46 surface, The amount of wear is approximately 4 μm, is very small, and the compressor performance is also good. On the other hand, in an untreated SKH material (see Comparative Example 4), the amount of wear is 15 μm, it cannot be used.

In blade 46 (vane) in which the blade surface has been nitride treated and given a surface of Hv1000 or more, the amount of wear of the blade tip by above friction wear tester shown in FIG. 13, was about 4 μm. Thus, it is effective for the blade tip wear that the height of the compound layer formed on the blade surface is 4 μm or more.

In Examples 10 to 14 shown in FIGS. 15 and 16, low temperature rotary compressors and high temperature rotary compressors were used. The pressure conditions were, discharge pressure 2.5 MPa, suction pressure 0.5 Mpa, and the compressor operating frequency was 90 Hz. An R134a refrigerant or an R32/R134a mixed refrigerant was used as the refrigerant for compression. Continuous operation was performed for 1000 hours using a trivalent hindered ester oil and a quadrivalent hindered ester oil as refrigerating machine oils. Wear assessments and contamination assessments were made.

In a sealed-type rotary compressor which uses HFC refrigerant, as shown by Examples 10 to 13 in FIG. 15, a Periodic Table Group IV nitride (TiN), a Group IV carbide (TiC), a Group IV oxide (TiO) or a mixture of these (for example, a mixture of TiC and TiN) were used in the blade 46 which is one of the sliding members. Also, cast iron containing Mo—Ni—Cr was used in the other sliding member (roller) which was the partner material, and an HFC refrigerant and a quadrivalent ester oil were used. Test results showed that the amounts of wear and contamination were small, and a good wear configuration could be obtained.

When cast iron containing Mo—Ni—Cr is used in the other sliding member (roller), which is the partner material, of the compressor sliding parts, good lubrication performance could be obtained due to the self-lubrication property of the graphite contained in the cast iron.

In Example 14 shown in FIG. 16, a mixed material of a Periodic Table Group IV oxide and a Group III oxide, for example a mixture of zirconia and alumina or a mixture of that mixture with yttria (mixed ceramics), were used in one of the sliding members (blade). In Example 14, when a quadrivalent ester oil was used in an HFC refrigerant, there was hardly any wear, the amount of blade tip wear was less than 1 μm. Thus, a very good sliding state can be expected over a long period.

In particular, in the rotary compressor in which a mixed ceramic composed mainly of alumina and zirconia is used in one of sliding member (blade), and cast iron containing Mo—Ni—Cr is used in the other sliding member (the roller), which is the partner material, the amount of wear is almost nothing at less than 1 μm, when a quadrivalent ester oil is used in the refrigerating machine oil. The amount of contamination is also excellent in that the amount of sludge attachment is extremely small. Therefore, this can be considered for application to a compressor in which the sliding conditions are severe, such as an inverter controlled system in which compressor motor is controlled at variable speed based on the output frequency of inverter circuit. In Example 14, it was found that even if a trivalent ester oil can be used in the refrigerating machine oil for this configuration. An actual machine test was performed with a compressor which adopted a blade made of 75 wt % zirconia, 20 wt % alumina and the remainder being a stabilizer.

FIG. 17 is a graph showing a result of blade material wear amounts in rotary compressor for various refrigerating machine oils and some blade material under an HFC refrigerant which was R134a refrigerant. In this test, the pressure conditions were discharge pressure 2 MPa and suction pressure 0.02 MPa. The compressors were operated continuously for 2000 hours at atmosphere temperatures of 120° C., and amounts of blade tip wear were compared with various refrigerating machine oil. Cast iron containing Mo—Ni—Cr was used for piston rollers 45, 45a, 45b which were the partner materials to the blades.

FIG. 17 also shows that surface hardening can be made Hv 1000 or more in a compressor which uses a mixed ceramic of alumina and zirconia in blade 46. When this is used in quadrivalent ester oil, hardly any wear is present, at an amount of 1 μm or less. Thus, the wear configuration in quadrivalent ester oil is very good.

FIG. 18 shows the results of Examples 15 to 17. these Tests, assessments were performed by the friction wear tester shown in FIG. 13. The assessments were carried out under test conditions of pressure conditions of atmospheric pressure 2 Mpa; causing a load of 250 kg to act; atmosphere temperature (instead of compressor temperature) 120° C.; sliding speed 1 m/sec; sliding time 4 hours. Wear assessments of the sliding materials were evaluated.

A Periodic Table Group IV, Group V or Group VI carbide (TiC, VC, CrC) was used as the parent material of one of the sliding members (pin P shown in FIG. 13) which composes the compressor sliding parts. When the parent material (disk D shown in FIG. 13) surfaces were respectively surface treated with thin nitride films of the same Groups, the sliding member surfaces were reformed. Therefore, surface harnesses of Hv 1000 or more could be obtained. When reforming the surfaces, the adhesion strength between the surface reforming film and the parent material can be increased by putting a surface reforming film of the same type of material into the parent material. Thus, the thin film can be used in HFC refrigerant and quadrivalent ester oil.

The Tables in FIGS. 19 and 20 also respectively show the results of Examples 18 to 20 and Examples 21 to 23 in which assessments were made by table tests using the same method as in FIG. 18.

In Examples 21 to 23, a Periodic Table Group IV, Group V or Group VI nitride (TiN, VN, CrN) or a Periodic Table Group IV, Group V or Group VI oxide (TiO, VO, CrO) was used as the parent material of one of the sliding members (blade 46). The parent material surfaces were respectively surface treated with thin carbide films of the same Groups (TiC, VC, CrC) or with thin nitride films of the same Groups (TiN, VN, CrN), and surface reforming was carried out. Thus, a surface harnesses of Hv 1000 or more could be obtained. When reforming the surfaces, the adhesion strength between the surface reforming film and the parent material can be increased by putting a surface reforming film of the same type of material into the parent material as the same as Example 15 to 17. Thus, it is possible to use a thin film in HFC refrigerant and quadrivalent ester oil. Combinations of Group IV, Group V or Group VI nitrides, carbides or oxides with carbides, nitrides and oxides of the same Groups in this way are desirable as sliding members of compressor sliding parts.

Chloride lubricant does not form in HFC refrigerants and quadrivalent ester oils. Thus, the surface friction coefficient increases. For this reason, the adhesion strength between the surface reforming film and the parent material is important.

The materials of Examples 15 to 23 are desirable to apply to the compressor sliding members or parts of rotary compressors 40, 60 and helical compressors 90. In rotary compressors 40, 60, it is desirable to use them in the sliding portion of which one sliding member is blade 46 and the other member is piston roller 45. In helical compressor 90, it is desirable to use them in the sliding portion of which one member is Oldham's ring 104 and the other member is piston 97 or cylinder bearings 93, 94. In piston 97 or cylinder bearings 93, 94 of helical compressor 90, for example, carbon steel is used.

As shown by Comparative Example 6 in FIG. 20, even if one of sliding members (blade 46) is a Group VI nitride (CrN) thin film treated with a Group IV nitride (TiN) and the other member (piston roller 45, 45a, 45b) uses cast iron containing Mo—Ni—Cr, the amount of wear is large because the adhesion strength is weak. It cannot apply to sealed-type compressors.

As shown by the results of Examples 15 to 23, in a sealed-type compressor, in which the other sliding member uses a ferrous alloy metal containing a Periodic Table Group VIA or Group V metal and the compressor uses HFC refrigerant and an at least quadrivalent ester oil, the wear of the sliding members can be reduced. By using cast iron containing Mo—Ni—Cr in piston roller 45, 45a, 45b which is the other sliding member in rotary compressors 40, 60, wear can be reduced in combination with the blade 46 material.

In a rotary compressor which used an HFC refrigerant and an at least quadrivalent ester oil, even making the vane hardness Hv1000 or more, it is necessary to make the surface inside blade groove 47 of cylinders 43, 43a, 43b which move relative to blade 46, smooth by lessening its surface roughness in order to decrease the overall wear. Conventional blade groove 47 is made by broach working, thus, its surface roughness will be as great as 4 S to 8 S. In these roughness, it is insufficient to reduce the wear by making solely blade 46 hardness Hv1000 or more.

Therefore, in rotary compressors 40, 60, it is desirable to polish the inner surface of suction side blade groove 47 after the broach working, and producing a surface accuracy of 1.6 S. The contact surface area between blade groove 47 and blade 46 is increased and the wear can be reduced by the polish working.

Furthermore, in this sealed-type compressor, it is desirable to use a hindered type alcohol for the alcohol which composes the at least quadrivalent ester oil used with the HFC refrigerant. A quadrivalent hindered type ester oil which uses a quadrivalent hindered type alcohol indicates high thermal stability and heat resistance. This is particularly necessary in cases where the compressor temperature is high, as with HFC refrigerants which include a large amount of difluoromethane (R32 refrigerant).

Ester oil is produced by the synthesis of fatty acid and alcohol. However, in C4 to C6 class fatty acids, the fatty acid esters have a high reactability with metals such as iron and copper. Therefore, C4 to C6 class fatty acids readily produce soaps of metals such as iron and copper, which become the causes of sludge. In order to prevent the ready production of metal soaps, it is necessary to make the fatty acid C7 to C11 class, and it is necessary to make the fatty acid mainly branched type. Therefore, it is preferable that the fatty acid, which is raw material of ester oil used in a sealed compressor, is a C7 to C11 class acid and wherein 50 vol % or more branched type fatty acid is included.

As shown in FIG. 21, a branched type ester oil has a carbon branch ($C_2H_5$) on the a $\alpha$ carbon which is next to the ester group (they are named $\alpha$, $\beta$, $\gamma$ from their proximity to the ester group). Therefore, this carbon branch becomes a steric hindrance and obstructs the penetration of water molecules. Thus, it is difficult for hydrolysis to occur.

Also, eater oil compatibility with HFC refrigerants is improved and the oil return becomes better by making a branched type fatty acid the main constituent of the branched ester oil. Therefore, deficiency of refrigerating machine oil in the sealed-type compressor can be prevented.

Figure 22:
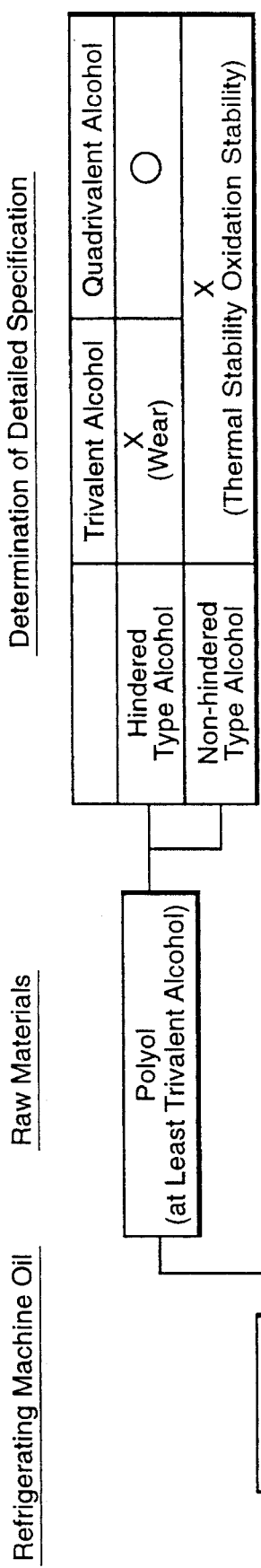
FIG. 22 is a diagram showing an example of the selection criteria for a polyol ester as a refrigerating machine oil.

In the selection of a refrigerating machine oil, apart from the viewpoint of compatibility with HFC refrigerants, from the viewpoint of moisture absorbency and electrical insulation the choice is restricted to polyol esters oils synthesized from polyols which are at least trivalent alcohols and monocarboxylic acid (having one carboxyl group). Furthermore, for the polyols, quadrivalent hindered alcohols are adopted from the consideration of bonding strength with sliding members, as shown in FIG. 22. Non-hindered alcohols which have inferior thermal stability and oxidation stability are not considered. Also trivalent alcohols, even though trivalent alcohols included in unhindered alcohols, are not considered because trivalent alcohols cause large wear to the sealed-type compressors.

The monocarboxylic acid which composes a quadrivalent ester oil is made 90 vol % or more branched type fatty acid (carboxylic acid) from consideration of hydrolysability and stability, compatibility with HFC refrigerants, and the like. Thus, a straight chain type fatty acid is mainly made to have a carbon branch (on the carbon closest to the ester group). In practice, laying stress on hydrolysability, the branched type fatty acid and straight chain fatty acid are set in the proportions of, for example, branched type about 90 vol %, straight chain type the remaining 10 vol %.

In an embodiment, the example of using a quadrivalent ester oil as the refrigerating machine oil, and preferably taking a quadrivalent hindered alcohol as its raw material has been described. However, a quinquevalent or above ester oil which has greater bonding power may also be used as the refrigerating machine oil.

In an embodiment, the sealed cases which are used in the sealed-type compressors of above embodiment includes completely sealed cases in which a lid and a tubular container having a bottom are joined together and secured by welding. However, another sealed case in which the lid and the container are secured by nuts and bolts can be used.

Figure 23:
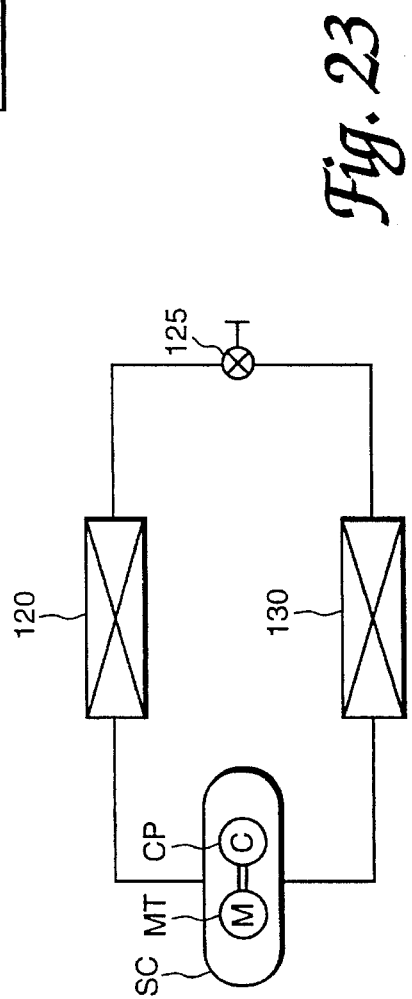
FIG. 23 is a diagram showing a refrigerating cycle using the sealed-type compressor.

Referring now to FIG. 23, a refrigerating cycle for these sealed-type compressors will be explained. Sealed-type compressor SC includes compressor motor MT and compressing machinery CP therein. Sealed-type compressor SC can be any of the types of sealed compressors 10, 40, 60, 70 and 90 described above. The refrigerating cycle comprises compressor SC, a condenser 120, expansion device 125 such as expansion valve, evaporator 130, and piping to connect these devices with each other to form a complete cycle. An HFC refrigerant is used in the refrigerating cycle.

The HFC refrigerant is compressed by compressor SC. Compressed refrigerant flows through the piping into condenser 120. The refrigerant condenses and radiates at condenser 120. Thus, the material such as air surrounding the condenser 120 is heated. Then, the refrigerant passes through expansion device 125, where its temperature and pressure are reduced. In evaporator 130, the refrigerant evaporates to cool the surrounding material.

When this refrigerating cycle is used in a refrigerator, the air in the refrigerator is cooled by evaporator 130, and the heat of refrigerant in condenser 120 is radiated outside of the refrigerator. When the refrigerating cycle is used in an air conditioner, evaporator 130 is used as an indoor heat exchanger, and condenser 120 is used as an outdoor heat exchanger. Therefore, a room installed evaporator 130 (indoor heat exchanger) is cooled by evaporator 130, and the heat of condenser 120 radiates to outside of the room.

The refrigerating cycle can also be used in a heat-pump air conditioner which can cool and heat a room, by providing a four-way valve which changes the direction of refrigerant flow.

Various changes and modifications the above described embodiment can be carried out without departing from the scope of general inventive concept as defined by the appended claims and their equivalents.

What is claimed is:

1. A compressor for use with an HFC refrigerant, comprising:

a sealed casing;

a motor housed within the sealed casing;

compression machinery also housed within the sealed casing, the compression machinery including first and second sliding members, the first sliding member comprising aluminum and having its surface alumite treated and the second sliding member being made of a metal material; and an at least quadrivalent ester oil for the refrigerating machine oil which lubricates the sliding members of the compressor.

2. A compressor according to claim 1, wherein the first sliding member has a molybdenum disulfide surface treatment layer over the alumite treatment.

3. A compressor according to claim 1 or 2, wherein the first member has a polytetrafluoroethylene surface treatment layer over the alumite treatment.

4. A compressor according to claim 1, wherein a sliding surface of the ferrous metal material which composes the second sliding member has a nitride treatment layer thereon.

5. A compressor according to claim 1, wherein the compression machinery comprises a reciprocating compressor including a connecting rod and a crankshaft, the first sliding member is the connecting rod and the second sliding member is the crankshaft.

6. A compressor according to claim 1, wherein the compression machinery comprises a scroll compressor including a vane, a crankshaft and an Oldham's ring, the first sliding member is the vane and the second sliding member is the crankshaft.

7. A compressor according to claim 1, wherein the compression machinery comprises a scroll compressor including a vane, a crankshaft and an Oldham's ring, and the first sliding member is the vane and the second sliding member is the Oldham's ring.

8. A compressor for use with an HFC refrigerant, comprising:

a sealed casing;

a motor housed within the sealed casing;

compression machinery also housed within the sealed casing, the compression machinery including a shaft made of globular graphite cast iron having a ferrite ratio of not more than 40%, and a bearing rotatablly supporting the shaft and made of a graphite cast iron bearing material; and an at least quadrivalent ester oil for the refrigerating machine oil which lubricates the shaft and the bearing.

9. A compressor for use with an HFC refrigerant, comprising:

a sealed casing;

a motor housed within the sealed casing;

compression machinery, also housed within the sealed casing, the compression machinery including a shaft made of flaky graphite cast iron having a ferrite ratio of not more than 15%, and a bearing rotatablly supporting the shaft and made of graphite cast iron bearing material; and an at least quadrivalent ester oil for the refrigerating machine oil which lubricates the shaft and the bearing.

10. A compressor according to claim 8 or 9, wherein the compression machinery comprises a reciprocating compressor including a crankshaft, the shaft is the crankshaft and the bearing is fixed to the sealed casing.

11. A compressor according to claim 8 or 9, wherein the compression machinery comprises a rotary compressor including a crankshaft a main bearing and a sub-bearing, the shaft is the crankshaft, and the bearing is the main bearing and the sub-bearing.

12. A compressor according to claim 8 or 9, wherein the compressor machinery comprises a scroll compressor including a crankshaft and a fixed frame fixed to the sealed casing, and the bearing is provided at the fixed frame.

13. A compressor according to claim 8 or 9, wherein the compressor machinery comprises a helical compressor including a cylinder, a piston having a piston shaft at both ends and eccentrically placed inside the cylinder, a main bearing which rotatablly supports one end of the piston and a sub-bearing which rotatablly supports the other end of the piston, and the shaft is the piston and the bearing is the main bearing.

14. A compressor according to claim 8 or 9, wherein the compressor machinery comprises a helical compressor including a cylinder, a piston having a piston shaft at both ends and eccentrically placed inside the cylinder, a main bearing which rotatablly supports one end of the piston and a sub-bearing which rotatablly supports the other end of the piston, and the shaft is the piston and the bearing is the sub-bearing.

15. A compressor for use with an HFC refrigerant, comprising:

a sealed casing;

a motor housed within the sealed casing;

compression machinery also housed within the sealed casing, the compression machinery including at least first and second sliding members at least one of which has a material density ratio of at least 95%; and an at least quadrivalent ester oil for the refrigerating machine oil which lubricates the sliding members of the compressor.

16. A compressor according to claim 15, wherein the sliding members are sintered metal forging material having isolated air holes.

17. A compressor according to claim 15 or 16, wherein the sliding members are made of a material in which Cu—Sn are infiltrated into a sintered metal forging material having a metal composition of Cu 2 wt %, C 0.8 wt % and the remainder mainly Fe.

18. A compressor according to claim 15 or 16, wherein the sliding members are a compound material in which Cu in infiltrated into a sintered metal forging material having a metal composition of Cu 2 wt %, C 0.8 wt % and the remainder mainly Fe.

19. A compressor for use with an HFC refrigerant, comprising:

a sealed casing;

a motor housed within the sealed casing;

compression machinery also housed within the sealed casing, the compression machinery including at least first and second sliding members wherein at least one of the sliding members is made of a material having a density ratio of less than 95%, in which air holes are sealed by a self-lubricating material; and an at least quadrivalent ester oil for the refrigerating machine oil which lubricates the sliding members of the compressor.

20. A compressor according to claim 19, wherein the self-lubricating material is one of PTFE, MoS, copper, tin and bronze.

21. A compressor for use with an HFC refrigerant, comprising:

a sealed casing;

a motor housed within the sealed casing;

compression machinery also housed within the sealed casing, the compression machinery including at least first and second sliding members one of the sliding members being made of a material having a surface hardness of at least Hv 1000 after the sliding surface has been nitride treated, and the other sliding material being made of cast iron containing Mo—Ni—Cr; and an at least quadrivalent ester oil for the refrigerating machine oil which lubricates the sliding members of the compressor.

22. A compressor according to claim 21, wherein the compressor machinery comprises a rotary compressor including a blade, a roller and a cylinder.

23. A compressor according to claim 22, wherein one sliding member is the blade, a tip of the blade being nitride treated and having a hardness of at least Hv 1000 and the other sliding member is the roller.

24. A compressor according to claim 23, wherein one sliding member is the blade, a tip of the blade being nitride treated and having a hardness of at least Hv 1000 and the other sliding member is the cylinder.

25. A compressor according to claim 23 or 24, wherein the blade surface is nitride treated while the compound layer of the nitride treated blade surface has a layer thickness of at least 4 μm.

26. A compressor for use with an HFC refrigerant, comprising:

a sealed casing;

a motor housed within the sealed casing;

compression machinery also housed within the sealed casing, the compression machinery including at least first and second sliding members, one sliding member being made of one of a Periodic Table Group IV nitride, Group IV carbide, Group IV oxide and a mixture of these, and the other sliding member being made of a ferrous alloy material; and an at least quadrivalent ester oil for the refrigerating machine oil which lubricates the sliding members of the compressor.

27. A compressor for use with an HFC refrigerant, comprising:

a sealed casing;

a motor housed within the sealed casing;

compression machinery also housed within the sealed casing, the compression machinery including at least first and second sliding members one of the sliding members being made of a mixture material of a Periodic Table Group IV oxide and a Group III oxide, and the other sliding member being made of a ferrous material; and an at least quadrivalent ester oil for the refrigerating machine oil which lubricates the sliding members of the compressor.

28. A compressor for use with an HFC refrigerant, comprising:

a sealed casing;

a motor housed within the sealed casing;

compression machinery also housed within the sealed casing, the compression machinery including at least first and second sliding members one of the sliding members being made of one of a Periodic Table Group IV carbide, Group IV nitride, Group IV oxide, Group V carbide, Group V nitride, Group V oxide, Group VI carbide, Group VI nitride and Group VI oxide as the parent material and surface treating that parent material surface by a thin film of one of nitride, carbide and oxide of the same Group of the parent material, and the other sliding member being made of a ferrous material; and an at least quadrivalent ester oil for the refrigerating machine oil which lubricates the sliding members of the compressor.

29. A compressor according to claim 21, 26, 27, or 28, wherein the other sliding member is made of an alloy cast iron containing a Periodic Table Group VIA or Group V metal.

30. A compressor for use with an HFC refrigerant, comprising:

a sealed casing;

a motor housed within the sealed casing;

compression machinery also housed within the sealed casing, the compression machinery including a cylinder, a roller housed in the cylinder, a blade dividing the inner space between the cylinder and the roller to suction space and discharge space; a blade groove slidablly housing the blade therein; the surface accuracy of the blade groove inner surface of at least the suction side out of the cylinder blade grooves which compose the sliding members of the said compressor being formed to not more than 1.6 s; and an at least quadrivalent ester oil for the refrigerating machine oil which lubricates the compression machinery.

31. A compressor according to claim 1, 8, 9, 15, 19, 21, 26, 27, 28 or 30 wherein the at least quadrivalent ester oil has an at least quadrivalent hindered alcohol.

32. A compressor according to claim 1, 8, 9, 15, 19, 21, 26, 27, 28 or 30 wherein the at least quadrivalent ester oil is produced by the synthesis of a fatty acid and an alcohol; the fatty acid being a C7 to C11 class acid, taking at least 50 vol % branched type fatty acid and less than 50 vol % straight chain type fatty acid.

33. A compressor according to claim 1, 8, 9, 15, 19, 21, 26, 27, 28 or 30 wherein the at least quadrivalent ester oil includes pentaerythritol or its multimers in its raw materials.

34. A compressor for use with an HFC refrigerant, comprising:

a sealed casing;

a motor housed within the sealed casing;

compression machinery also housed within the sealed casing, the compression machinery including at least first and second sliding members; and an at least quadrivalent ester oil for the refrigerating machine oil which lubricates the sliding members of the compressor in which the at least quadrivalent alcohol which forms the at least quadrivalent ester oil being a hindered alcohol.

35. A compressor according to claim 34 wherein the ester oil synthesis of a fatty acid and an alcohol, and the fatty acid being a C7 is produced C11 class acid, taking at least 50 vol % branched type fatty acid and less than 50 vol % straight chain type fatty acid.

36. A compressor for use with an HFC refrigerant, comprising:

a sealed casing;

a motor housed within the sealed casing;

compression machinery also housed within the sealed casing, the compression machinery including at least first and second sliding members; and an at least quadrivalent ester oil, which is includes pentaerythritol or its multimers in its raw materials, for lubricating the sliding members of the compressor.

37. A refrigerating cycle comprising:

a sealed-type compressor including a sealed housing which houses a motor and compression machinery, the compression machinery including at least first and second sliding members, one sliding member having aluminum as its main body and having its surface alumite treated and the other sliding member being made of a metal;

an evaporator;

a condenser;

an expansion device;

an HFC refrigerant which is compressed by the compression machinery; and an at least quadrivalent ester oil for the refrigerating machine oil which lubricates the sliding members of the compressor.

38. A refrigerating cycle comprising:

a sealed-type compressor including a sealed housing which houses a motor and compression machinery, the compression machinery includes a shaft included in the compression machinery has globular graphite cast iron with a ferrite ratio of not more than 40% and a bearing rotatablly supporting the shaft is made of graphite cast iron bearing material;

an evaporator;

a condenser;

an expansion device;

an HFC refrigerant which is compressed by the compression machinery; and an at least quadrivalent ester oil for the refrigerating machine oil which lubricates the shaft and the bearing.

39. A refrigerating cycle comprising:

a sealed-type compressor including a sealed housing which houses a motor and compression machinery, the compression machinery includes a shaft included in the compression machinery has flaky graphite cast iron with a ferrite ratio of not more than 15% and a bearing rotatablly supporting the shaft is made of graphite cast iron bearing material an evaporator;

a condenser;

an expansion device;

an HFC refrigerant which is compressed by the compression machinery; and an at least quadrivalent ester oil for the refrigerating machine oil which lubricates the shaft and the bearing.

40. A refrigerating cycle comprising:

a sealed-type compressor including a sealed housing which houses a motor and compression machinery, the compression machinery includes at least a pair of sliding members in which at least one of the sliding member having a material with a density ratio of at least 95%;

an evaporator;

a condenser;

an expansion device;

an HFC refrigerant which is compressed by the compression machinery; and an at least quadrivalent ester oil for the refrigerating machine oil which lubricates the sliding members of the compressor.

41. A refrigerating cycle comprising:

a sealed-type compressor includes a sealed housing which houses a motor and compression machinery, the compression machinery includes at least a pair of sliding members in which at least one of the sliding member having a material with a density ratio of less than 95%, and air holes are sealed by a self-lubricating material at least one of the sliding member having a material with a density ratio of at least 95%;

an evaporator;

a condenser;

an expansion device;

an HFC refrigerant which is compressed by the compression machinery; and an at least quadrivalent ester oil for the refrigerating machine oil which lubricates the sliding members of the compressor.

42. A refrigerating cycle comprising:

a sealed-type compressor includes a sealed housing which houses a motor and compression machinery, the compression machinery includes at least a pair of sliding members in which one of the sliding member is made of a material of surface hardness at least Hv1000 after the sliding surface has been nitride treated, and the other sliding material is made of cast iron containing Mo—Ni—Cr;

an evaporator;

a condenser;

an expansion device;

an HFC refrigerant which is compressed by the compression machinery; and an at least quadrivalent ester oil for the refrigerating machine oil which lubricates the sliding members of the compressor.

43. A refrigerating cycle comprising:

a sealed-type compressor including a sealed housing which houses a motor and compression machinery, the compression machinery includes at least a pair of sliding members is included in the compression machinery, wherein one of sliding member is made of one of a Periodic Table Group IV nitride, Group IV carbide, Group IV oxide and a mixture of these, and the other sliding member is made of a ferrous alloy material;

an evaporator;

a condenser;

an expansion device;

an HFC refrigerant which is compressed by the compression machinery; and an at least quadrivalent ester oil for the refrigerating machine oil which lubricates the sliding members of the compressor.

44. A refrigerating cycle comprising:

a sealed-type compressor including a sealed housing which houses a motor and compression machinery, the compression machinery includes at least a pair of sliding members is included in the compression machinery, wherein one of sliding member is made of a mixture material of a Periodic Table Group IV oxide and a Group III oxide, and the other sliding member is made of a ferrous material;

an evaporator;

a condenser;

an expansion device;

an HFC refrigerant which is compressed by the compression machinery; and an at least quadrivalent ester oil for the refrigerating machine oil which lubricates the sliding members of the compressor.

45. A refrigerating cycle comprising:

a sealed-type compressor including a sealed housing which houses a motor and compression machinery, the compression machinery includes at least a pair of sliding members wherein one of sliding member is made of one of a Periodic Table Group IV carbide, Group IV nitride, Group IV oxide, Group V carbide, Group V nitride, Group V oxide, Group VI carbide, Group VI nitride and Group VI oxide as the parent material and surface treating that parent material surface by a thin film of one of nitride, carbide and oxide of the same Group of the parent material, and the other sliding member is made of a ferrous material;

an evaporator;

a condenser;

an expansion device;

an HFC refrigerant which is compressed by the compression machinery; and an at least quadrivalent ester oil for the refrigerating machine oil which lubricates the sliding members of the compressor.

46. A refrigerating cycle comprising:

a sealed-type compressor includes a sealed housing which houses a motor and rotary compression machinery, the rotary compression machinery includes a cylinder included in the rotary compression machinery, a roller housed in the cylinder and included in the rotary compression machinery, a blade dividing the inner space between the cylinder and the roller to suction space and discharge space and a blade groove slidablly housing the blade therein; and the surface accuracy of the blade groove inner surface of at least the suction side out of the cylinder blade grooves which compose the sliding members of the said compressor being formed to not more than 1.6 s;

an evaporator;

a condenser;

an expansion device;

an HFC refrigerant which is compressed by the compression machinery; and an at least quadrivalent ester oil for the refrigerating machine oil which lubricates the compression machinery.

47. A refrigerating cycle comprising:

a sealed-type compressor includes a sealed housing which houses a motor and rotary compression machinery, the compression machinery includes at least a pair of sliding members:

an evaporator;

a condenser;

an expansion device;

an HFC refrigerant which is compressed by the compression machinery; and an at least quadrivalent ester oil for the refrigerating machine oil which lubricates the sliding members of the compressor in which the at least quadrivalent alcohol which forms the at least quadrivalent ester oil being a hindered alcohol.

48. A refrigerating cycle comprising:

a sealed-type compressor includes a sealed housing which houses a motor and compression machinery, the compression machinery includes at least a pair of sliding members;

an evaporator;

a condenser;

an expansion device;

an HFC refrigerant which is compressed by the compression machinery; and an at least quadrivalent ester oil, which is includes pentaerythritol or its multimers in its raw materials, for lubricating the sliding members of the compressor.

* * * * *